US009720346B2

(12) United States Patent
Furuta et al.

(10) Patent No.: US 9,720,346 B2
(45) Date of Patent: Aug. 1, 2017

(54) IMAGE FORMING APPARATUS CAPABLE OF CORRECTING RELATIVE POSITION BETWEEN LASER BEAMS

(71) Applicant: CANON KABUSHIKI KAISHA, Tokyo (JP)

(72) Inventors: Yasutomo Furuta, Abiko (JP); Shunsaku Kondo, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/871,341

(22) Filed: Apr. 26, 2013

(65) Prior Publication Data

US 2013/0286133 A1 Oct. 31, 2013

(30) Foreign Application Priority Data

Apr. 26, 2012 (JP) ................................ 2012-101251
Apr. 15, 2013 (JP) ................................ 2013-084762

(51) Int. Cl.
*G06K 15/02* (2006.01)
*B41J 2/385* (2006.01)
(Continued)

(52) U.S. Cl.
CPC ....... *G03G 15/0435* (2013.01); *G03G 15/043* (2013.01)

(58) Field of Classification Search
CPC ... B21J 2/473; B21J 2/45; B21J 2/385; G03G 15/043; G03G 15/0435; G03G 15/0415
(Continued)

(56) References Cited

U.S. PATENT DOCUMENTS 7,129,967 B2 * 10/2006 Seki ....................... H04N 1/047 347/249
7,586,511 B2 * 9/2009 Seki ....................... H04N 1/047 347/249
(Continued)

FOREIGN PATENT DOCUMENTS

JP 09-011538 A 1/1997
JP H09-174917 A 7/1997
(Continued)

OTHER PUBLICATIONS

Partial European Search Report for corresponding EP 13165038.4, dated Oct. 1, 2013.
(Continued)

*Primary Examiner* — Henok Legesse
(74) *Attorney, Agent, or Firm* — Rossi, Kimms & McDowell LLP

(57) ABSTRACT

An image forming apparatus capable of correcting relative position in exposure position between laser beams that scan a photosensitive drum in a scanning direction of the laser beams. A semiconductor laser includes first and second light emitting elements for emitting first and second laser beams. These elements are arranged such that the laser beams expose positions on the photosensitive drum different in the sub scanning direction. A polygon mirror deflects the laser beams to scan the photosensitive drum. Relative position in the scanning direction between images to be formed on the photosensitive drum by exposure by the first and second laser beams is corrected based on correction data. An image data generation section generates drive signals associated with the respective light emitting elements. A semiconductor laser drive circuit causes the semiconductor laser to emit the first and second laser beams, based on the drive signals.

34 Claims, 10 Drawing Sheets

(51) Int. Cl.

| | |
|---|---|
| ***B41J 2/435*** | (2006.01) |
| ***B41J 2/455*** | (2006.01) |
| ***B41J 2/47*** | (2006.01) |
| ***G06F 3/12*** | (2006.01) |
| ***G03G 15/043*** | (2006.01) |

(58) Field of Classification Search
USPC ........... 347/118, 234, 224, 233; 358/1.2, 1.1
See application file for complete search history.

(56) References Cited

U.S. PATENT DOCUMENTS

| | | | | |
|---|---|---|---|---|
| 2010/0111567 | A1* | 5/2010 | Yamazaki | 399/167 |
| 2011/0205324 | A1* | 8/2011 | Shukuya | 347/116 |
| 2011/0285804 | A1* | 11/2011 | Esumi | 347/224 |
| 2012/0194827 | A1* | 8/2012 | Nakamura | 358/1.2 |
| 2013/0286144 | A1* | 10/2013 | Nakahata | 347/224 |

FOREIGN PATENT DOCUMENTS

| | | | | |
|---|---|---|---|---|
| JP | 2002096499 | A | | 4/2002 |
| JP | 2002341279 | A | | 11/2002 |
| JP | 2003270562 | A | | 9/2003 |
| JP | 2003322810 | A | | 11/2003 |
| JP | 2005096351 | A | * | 4/2005 |
| JP | 2005208323 | A | | 8/2005 |
| JP | 2010269547 | A | | 12/2010 |
| JP | 2011170149 | A | | 9/2011 |
| JP | 2011242618 | A | | 12/2011 |

OTHER PUBLICATIONS

Office Action issued in KR10-2013-0043510, mailed Jul. 14, 2015.
Office Action issued in Japanese Patent Application No. 2013084762 mailed Apr. 11, 2017. English translation provided.

* cited by examiner

D1

| | PHASE[um] |
|---|---|
| MAIN-SCANNING POSITION[mm] | BETWEEN BEAMS 1 AND 4 |
| h1 | m1 |
| h2 | m2 |
| h3 | m3 |
| h4 | m4 |
| h5 | m5 |
| h6 | m6 |

D2

| | PHASE[um] | | | |
|---|---|---|---|---|
| MAIN-SCANNING POSITION[mm] | BEAM 1 | BEAM 2 | BEAM 3 | BEAM 4 |
| h1 | p11 | 0 | p13 | p14 |
| h2 | p21 | 0 | p23 | p24 |
| h3 | p31 | 0 | p33 | p34 |
| h4 | p41 | 0 | p43 | p44 |
| h5 | p51 | 0 | p53 | p54 |
| h6 | p61 | 0 | p63 | p64 |

| MAIN-SCANNING POSITION[mm] | INCLINATION |
|---|---|
| h1 | k1 |
| h2 | k2 |
| h3 | k3 |
| h4 | k4 |
| h5 | k5 |
| h6 | k6 |

IMAGE FORMING APPARATUS CAPABLE OF CORRECTING RELATIVE POSITION BETWEEN LASER BEAMS

BACKGROUND OF THE INVENTION

1. Field of the Invention

The present invention relates to an image forming apparatus based on an electrophotographic method, which exposes a photosensitive member to a plurality of laser beams.

2. Description of the Related Art

It is conventionally known that in an image forming apparatus based on an electrophotographic method, such as a laser printer or a copying machine, a light beam scanning device that emits laser beams is generally used to form an electrostatic latent image on a photosensitive drum (photosensitive member).

The image forming apparatus based on the electrophotographic method uses a light beam scanning device. The light beam scanning device deflects a laser beam converted to a collimated laser beam by a collimator lens, using a polygon mirror, and the deflected laser beam is passed through an elongated f-θ lens to form an image on the photosensitive drum. The light beam scanning device of this type employs a method of simultaneously scanning a plurality of laser beams, so as to adapt to higher printing speed and higher resolution. For an apparatus that forms an electrostatic latent image on the photosensitive drum using a plurality of laser beams, rotation adjustment of a laser device is performed during assembly of the apparatus, so as to adjust relative image forming positions of the plurality of laser beams in the direction rotation of the photosensitive drum (sub scanning direction). By performing the rotation adjustment of the laser device, it is possible to cause the intervals of pixels in the sub scanning direction obtained by developing the electrostatic latent image to match a resolution.

Image forming apparatuses of these days are demanded to output high-resolution images. To meet the needs, the laser device is subjected to rotation adjustment such that the intervals of image forming positions of the plurality of laser beams in the direction of rotation of the photosensitive drum match a resolution. When the plurality of laser beams expose positions on a photosensitive drum shifted in the direction of scanning the photosensitive drum (main scanning direction), shifts in the main scanning direction are produced between pixels formed by the laser beams. Therefore, the timing of emission of each of laser beams from the laser device is controlled so as to prevent shifts in the main scanning direction between the pixels formed by the laser beams from being produced due to shifts of the laser beams in the main scanning direction.

On the other hand, in the image forming apparatus that forms an electrostatic latent image on the photosensitive drum using a plurality of laser beams, deviation of the relative positional relationship between dots (pixels) formed by respective laser beams from a desired positional relationship produces a periodical image shift, which causes moiré and like harmful effects on an image. To overcome this problem, it is necessary to adjust the laser device during assembly of the apparatus with high accuracy. Japanese Patent Laid-Open Publication No. H09-11538 proposes to adjust differences in scanning length between a plurality of laser beams on a laser beam-by-laser beam basis and adjust writing start positions of the respective laser beams on a laser beam-by-laser beam basis.

However, the shift in exposure position in the main scanning direction between laser beams sometimes differs depending on each position in the main scanning direction. In such a case, the adjustment of the entire scanning length and the adjustment of the writing start position alone are not enough for the adjustment of the dot position shift. In the following, a description will be given of a case where the amount of exposure position shift between laser beams varies with each scanning position.

In a light beam scanning device that converges laser beams onto a photosensitive drum via a lens, field curvature, which is a phenomenon in which a focus position varies with each position on a scanning surface, is caused depending on a molded state of the lens, and the field curvature also causes an exposure position shift.

FIGS. 9A to 9C show the relationship between a focus position shift and a shift in the main scanning direction in position of each of pixels formed by a plurality of laser beams. In this example, for simplicity of explanation, a description is given of an image forming apparatus that exposes a photosensitive drum by four laser beams 1, 2, 3, and 4. FIGS. 9A to 9C illustrates four pixels which are obtained by developing electrostatic latent images formed on the photosensitive drum by exposing the same sequentially from an upper side as viewed in FIGS. 9A to 9C using the respective laser beams 1, 2, 3, and 4. FIG. 9D shows the relationship between the focus position of a laser beam in the main scanning direction and the position of the surface of the photosensitive drum.

As shown in FIG. 9D, the focus position of the laser beam varies with the position on the surface of the photosensitive drum in the main scanning direction. When the laser beams are in focus on the photosensitive drum surface, the four pixels formed by developing electrostatic latent images formed on the photosensitive drum by exposing the same using the respective laser beams that form image thereon are at the same position in the main scanning direction (left-right direction, as viewed in FIG. 9A). The state illustrated in FIG. 9A is an ideal state in which the pixels formed by the laser beams are not shifted in the main scanning direction. However, when the focus positions of the laser beams are forward of (toward a near side with respect to) the drum surface, the lengths of optical paths of the plurality of laser beams are changed, and hence the relative positional relationship between the exposure positions of the laser beams deviates from a proper one. In this case, four pixels formed by developing electrostatic latent images formed on the photosensitive drum by exposing the same using the respective laser beams are shifted in the main scanning direction as shown in FIG. 9B. Similarly, when the focus positions of the laser beams are rearward of (toward a far side with respect to) the drum surface, four pixels formed by developing electrostatic latent images formed on the photosensitive drum by exposing the same by the respective laser beams are also shifted in the main scanning direction as shown in FIG. 9C.

In a scanning optical system using a polygon mirror, the focus position with respect to the scanning surface is made substantially constant e.g. by an f-θ lens. However, there is a limit to adjustment of the focus position by the f-θ lens, and hence the above-mentioned field curvature occurs, i.e. the focus position varies with each position on the scanning surface. As described above, in the case of the image forming apparatus that performs image formation using a plurality of laser beams, when the focus positions of the laser beams are shifted with respect to the position of the exposure surface of the photosensitive drum, the positions of pixels are shifted.

SUMMARY OF THE INVENTION

The present invention provides an image forming apparatus which is capable of correcting shifts in exposure position between a plurality of laser beams that scan a photosensitive drum in a scanning direction of the laser beams.

In a first aspect of the present invention, there is provided an image forming apparatus comprising a photosensitive member configured to be rotatable, a light source including a first light emitting element for emitting a first laser beam and a second light emitting element for emitting a second laser beam and configured to expose the photosensitive member so as to form an electrostatic latent image corresponding to an image to be formed on a recording medium, on the photosensitive member, the first light emitting element and the second light emitting element being arranged such that the first laser beam and the second laser beam expose respective positions on the photosensitive member different in a direction of rotation of the photosensitive member, a deflection unit configured to deflect the first and second laser beams emitted from the light source such that the first and second laser beams scan the photosensitive member, a lens configured to guide the first and second laser beams deflected by the deflection unit to the photosensitive member, an output unit configured to output correction data for correcting a relative position between a first image to be formed on the photosensitive member by exposure of the photosensitive member by the first laser beam having passed through the lens and a second image to be formed on the photosensitive member by exposure of the photosensitive member by the second laser beam having passed through the lens, in a scanning direction in which the first and second laser beams scan, a generation unit configured to generate drive data corresponding to each of the first light emitting element and the second light emitting element based on input image data, generate a drive signal for driving the first light emitting element based on the drive data for driving the first light emitting element, and generate a drive signal corresponding to the second light emitting element based on the drive data for driving the second light emitting element and the correction data output from the output unit, and a drive unit configured to cause the light source to emit the first laser beam and the second laser beam, based on the drive signals generated by the generation unit in association with the respective first and second light emitting elements.

In a second aspect of the present invention, there is provided an image forming apparatus comprising a photosensitive member configured to be rotatable, a light source including a plurality of light emitting elements for emitting a plurality of laser beams to expose the photosensitive member so as to form an electrostatic latent image corresponding to an image to be formed on a recording medium, the plurality of light emitting elements being arranged such that the laser beams expose respective positions on the photosensitive member different in a direction of rotation of the photosensitive member, a deflection unit configured to deflect the plurality of laser beams emitted from the light source such that the laser beams scan the photosensitive member, a lens configured to guide the laser beams deflected by the deflection unit to the photosensitive member, an output unit configured to output correction data for correcting relative positions between images to be formed on the photosensitive member by exposure thereof by the plurality of laser beams having passed through the lens, in a scanning direction in which the laser beams scan, for each of the plurality of light emitting elements, a generation unit configured to generate drive data corresponding to each of the plurality of light emitting elements based on input image data, and generate drive signals for driving the plurality of light emitting elements, respectively, based on the drive data generated for each of the plurality of light emitting elements and the correction data output from the output unit for each of the plurality of light emitting elements, and a drive unit configured to cause the light source to emit the plurality of laser beams, based on the drive signals generated by the generation unit.

According to the present invention, when an image is formed by a plurality of laser beams, it is possible to properly correct exposure position shifts in the scanning direction between the laser beams.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Figure 1:
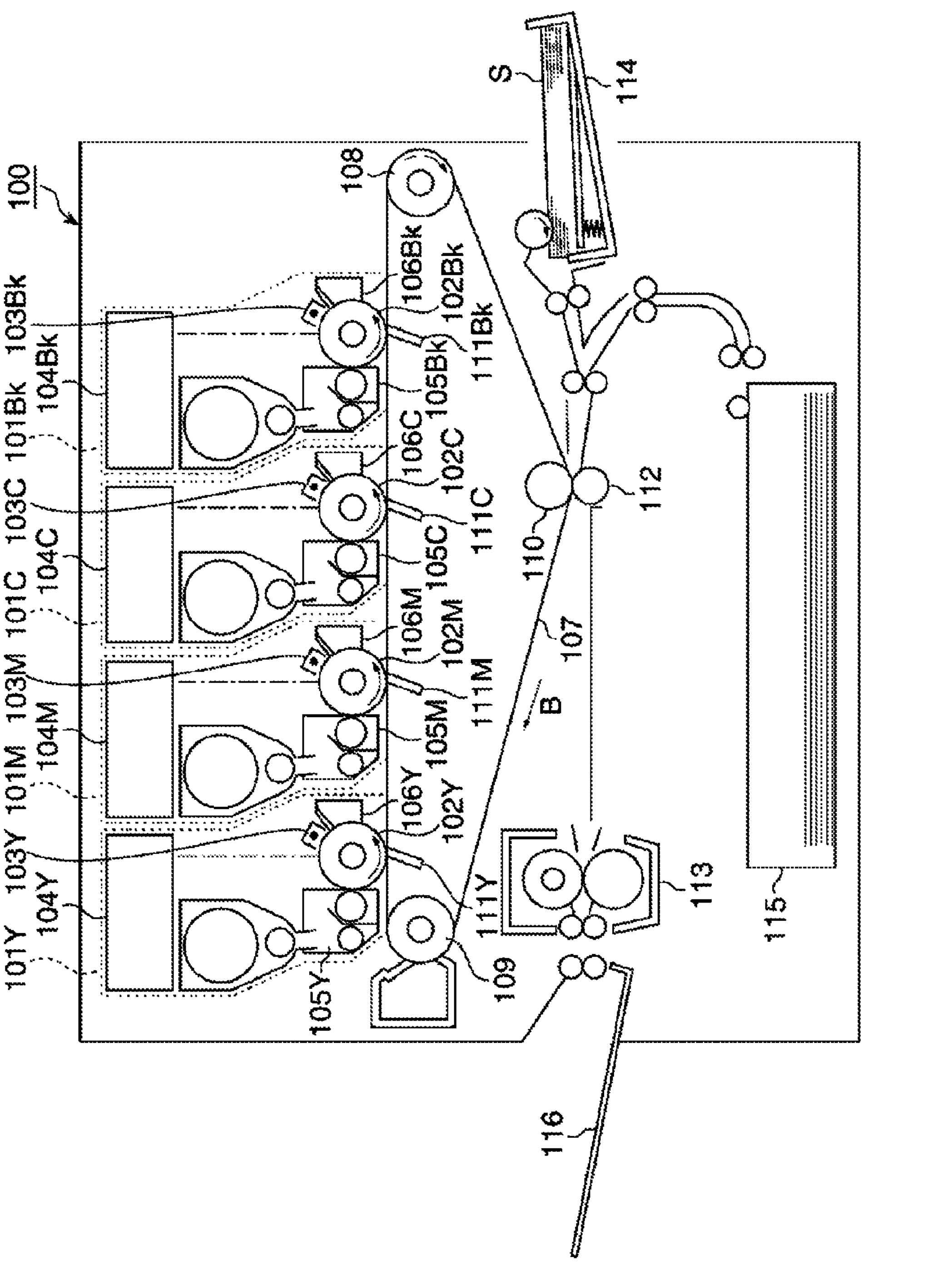
FIG. 1 is a schematic cross-sectional view of an image forming apparatus according to a first embodiment of the present invention.

FIG. 1 is a schematic cross-sectional view of an image forming apparatus according to a first embodiment of the present invention.

First, an outline will be given of control performed by the image forming apparatus 100. The image forming apparatus 100 adjusts dot positions in the main scanning direction between laser beams (light beams) according to a scanning position in the main scanning direction which is a direction in which the laser beams scan. The dot positions are adjusted by adjusting a writing start position on a beam-by-beam basis and performing magnification adjustment in each of a plurality of areas separated in the main scanning direction (hereinafter referred to as partial magnification adjustment). A detailed description of the control will be given hereafter.

The image forming apparatus 100 is constructed as a digital full color printer (color image forming apparatus) that forms an image using a plurality of color toners. In the present embodiment, although the color image forming apparatus including a light beam scanning device provided therein is described by way of example, the present embodiment is not limited to this, but it is applicable to an image forming apparatus that forms an image using only a monochrome toner (e.g. black toner) including a light beam scanning device provided therein.

The image forming apparatus 100 is provided with four image forming sections 101Y, 101M, 101C, and 101Bk. In the present embodiment, Y, M, C, and Bk added to the reference numeral 101 as color-indicative additional characters represent yellow, magenta, cyan, and black, respectively. The image forming sections 101Y, 101M, 101C, and 101Bk perform image formation using yellow toner, magenta toner, cyan toner, and black toner, respectively.

The image forming sections 101Y, 101M, 101C, and 101Bk are provided with respective photosensitive drums 102Y, 102M, 102C, and 102Bk as photosensitive members. Around each of the photosensitive drums 102Y, 102M, 102C, and 102Bk, there are provided an associated one of electrostatic chargers 103Y, 103M, 103C, and 103Bk, an associated one of light beam scanning devices 104Y, 104M, 104C, and 104Bk, and an associated one of developing devices 105Y, 105M, 105C, and 105Bk. Further, drum cleaning devices 106Y, 106M, 106C, and 106Bk are disposed close to the respective photosensitive drums 102Y, 102M, 102C, and 102Bk.

Below the photosensitive drums 102Y, 102M, 102C, and 102Bk, there extends an endless belt-shaped intermediate transfer belt 107. The intermediate transfer belt 107 is stretched between a driving roller 108 and driven rollers 109 and 110 and performs rotation during image formation in a direction indicated by an arrow B in FIG. 1. At locations opposed to the respective photosensitive drums 102Y, 102M, 102C, and 102Bk via the intermediate transfer belt 107, there are disposed primary transfer devices 111Y, 111M, 111C, and 111Bk, respectively.

Further, in the present embodiment, the image forming apparatus 100 is provided with a secondary transfer device 112 for transferring a toner image formed on the intermediate transfer belt 107 onto a recording medium S and a fixing device 113 for fixing the toner image on the recording medium S.

Now, a description will be given of an image forming process from a charging step to a developing step performed by the image forming apparatus 100 constructed as above. The image forming processes executed by the respective image forming sections 101 are identical. Therefore, the following description is given by taking an example of the image forming process performed by the image forming section 101Y, and description of the image forming processes executed by the other image forming sections 101M, 101C, and 101Bk, respectively, is omitted.

First, the photosensitive drum 102Y being driven for rotation is charged by the electrostatic charger 103Y of the image forming section 101Y. The charged photosensitive drum 102Y is exposed to laser beams (laser beams) emitted from the light beam scanning device 104Y. As a consequence, an electrostatic latent image is formed on the rotating photosensitive drum 102Y. Thereafter, the electrostatic latent image is developed as a yellow toner image by the developing device 105Y.

In the following, how the image forming process proceeds in and after the transfer step will be described. Each of the primary transfer devices 111Y, 111M, 111C, and 111Bk applies a transfer bias voltage to the intermediate transfer belt 107. As a consequence, each of the yellow, magenta, cyan, and black toner images formed on the photosensitive drums 102Y, 102M, 102C, and 102Bk of the respective image forming sections is transferred onto the intermediate transfer belt 107. This causes the toner images in the respective colors to be superimposed one upon another on the intermediate transfer belt 107.

After the toner images in the four colors are transferred onto the intermediate transfer belt 107, the four-color toner image on the intermediate transfer belt 107 is transferred again by the secondary transfer device 112. More specifically, the four-color toner image is transferred onto a recording medium S conveyed from a manual sheet feed cassette 114 or a sheet feed cassette 115 to the secondary transfer device 112. Then, the toner image on the recording medium S is thermally fixed by the fixing device 113, and then the recording medium S is discharged onto a discharge section 116. Thus, the recording medium S having a full-color image formed thereon is obtained.

Note that after completion of the transfer, each of the photosensitive drums 102Y, 102M, 102C, and 102Bk has residual toner thereon removed by an associated one of the drum cleaning devices 106Y, 106M, 106C, and 106Bk, whereafter the above-described image forming process is continued.

Figure 2:
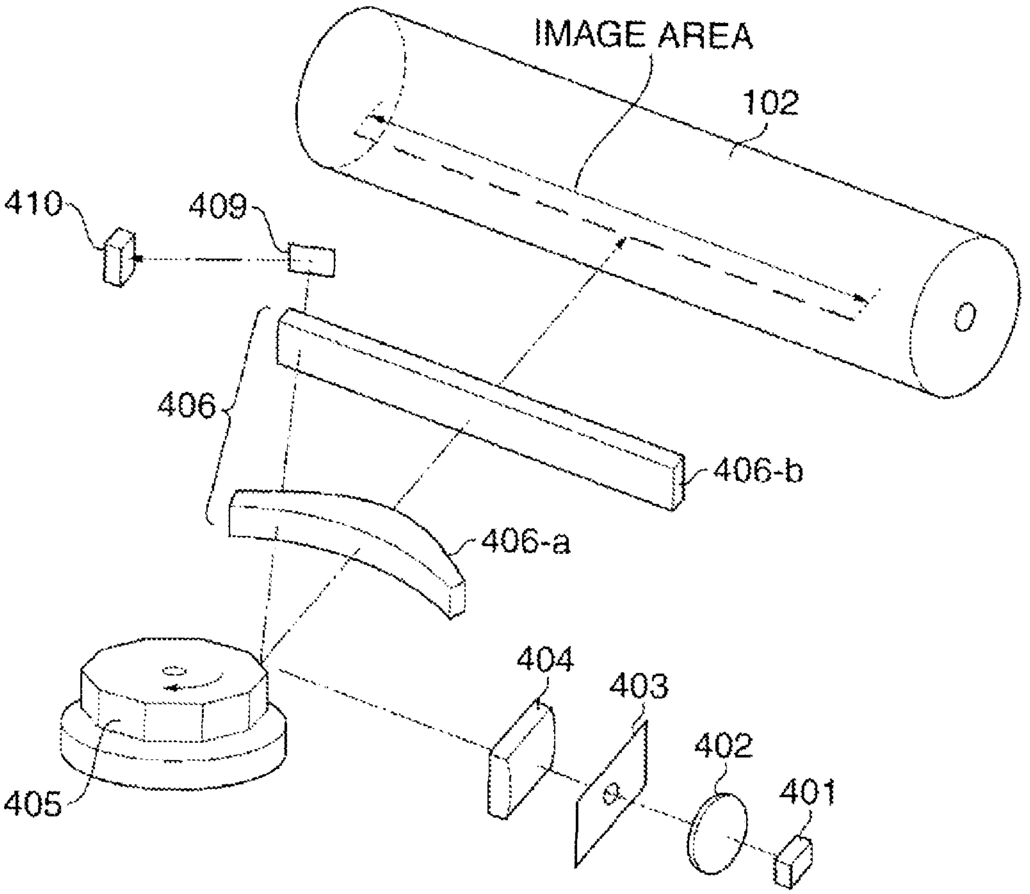
FIG. 2 is a perspective view of a light beam scanning device.

FIG. 2 is a perspective view of one of the light beam scanning devices.

A description will be given, with reference to FIG. 2, of the light beam scanning devices 104Y, 104M, 104C, and 104Bk. The light beam scanning devices 104 are identical in construction, and therefore, the reference symbol Y, M, C, or Bk is omitted unless particularly specified.

The light beam scanning device 104 includes a semiconductor laser 401 as a light source, a collimator lens 402, a diaphragm 403, a cylindrical lens 404, a rotary polygon mirror 405 (deflection unit). Further, the light beam scanning device 104 includes f-θ lenses 406 (406-*a* and 406*b*) and a BD sensor 410 as an optical sensor. The semiconductor laser 401 emits a desired amount of a laser beam based on a control signal from a sequence controller, not shown, and the emitted laser beam passes the collimator lens 402, the diaphragm 403, and the cylindrical lens 404, whereby the entire flux of the laser beam is converted to a collimated laser beam substantially parallel to an optical axis. The collimated laser beam enters the polygon mirror 405, with a predetermined beam diameter.

The polygon mirror 405 is driven by a polygon motor, not shown, for rotation at a uniform angular velocity. The laser beam having entered the polygon mirror 405 is deflected, and the deflected laser beam continuously changes the angle of its optical path with respect to the light path of the incident laser beam. The deflected laser beam passes through the f-θ lenses 406 to thereby scan the surface of the photosensitive drum 102 at a uniform speed.

The image forming apparatus 100 of the present embodiment employs a multi-beam system. More specifically, in the semiconductor laser 401, four light emitting elements implemented e.g. by laser diodes are arranged in the sub scanning direction (i.e. such that the light emitting elements expose respective different positions in the rotational direction of the photosensitive drum 102), and emit laser beams simultaneously. Although in the present embodiment, the semiconductor laser 401 is provided with four light emitting elements, the number of the light emitting elements is not limited to four, but it may be any plural number.

Hereafter, the laser beams emitted from the four light emitting elements of the semiconductor laser 401, respectively, are simply referred to as "the laser beams 1, 2, 3, and 4" or "the beams 1, 2, 3, and 4", respectively, in the order of arrangement of the light emitting elements. The beam 2 corresponds to a first laser beam in the present invention, and the beams 1, 3, and 4 correspond to a second laser beam in the present invention. The light emitting element that emits the beam 2 corresponds to a first light emitting element in the present invention, and the light emitting elements that emit the respective beams 1, 3, and 4 correspond to a second light emitting element. Further, an image formed by the laser beam 2 corresponds to a first image in the present invention, and images formed by the laser beam 1, 3, and 4 each correspond to a second image.

The BD sensor 410 is disposed at a position where enters a laser beam which is reflected from a reflection mirror 409 after being deflected by the polygon mirror and passing through the f-θ lenses 406. The BD sensor 410 generates a synchronization signal in response to entering of the laser beam, and a CPU, described hereinafter, controls timing for laser beam emission based on the synchronization signal as a reference. Specifically, the BD sensor 410 outputs the synchronization signal in response to reception of at least one (e.g. the beam 1) of the four beams 1 to 4.

Figure 3:
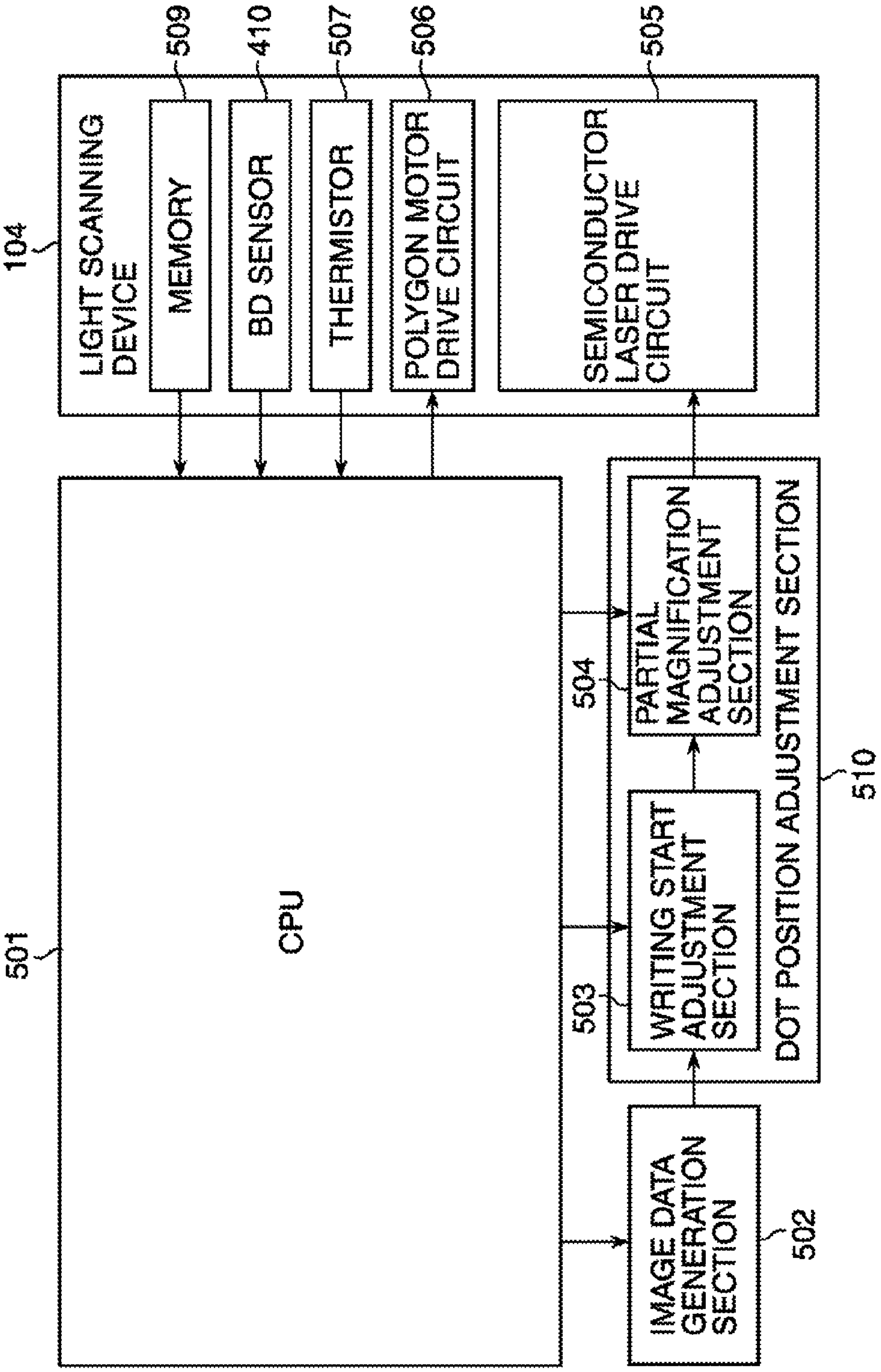
FIG. 3 is a diagram of a control block of the image forming apparatus, which performs dot position adjustment.

FIG. 3 is a diagram of a control block of the image forming apparatus 100, which performs dot position adjustment.

The control block comprises the CPU 501, an image data generation section 502, a dot position adjustment section 510, and the light beam scanning device 104. Within the light beam scanning device 104, there are provided a memory 509, the BD sensor 410, a thermistor 507 (detection unit), a polygon motor drive circuit 506, and a semiconductor laser drive circuit 505 (drive unit).

The CPU 501 and the memory 509 correspond to a control unit and a storage unit of the present invention, respectively, and cooperate with each other to form an output unit. Further, the image data generation section 502 and the dot position adjustment section 510 form a generation unit.

The image data generation section 502 generates image data before image formation according to an instruction from the CPU 501 and transmits the image data on a scanning line basis. The image data generated here is drive data for driving each of the light emitting elements based on input image data. An image data transmission instruction from the CPU 501 is issued a predetermined time period after transmission of a BD (beam detection) signal (synchronization signal) from the BD sensor 410 to the CPU 501.

To generate a screen image, the CPU 501 designates a screen angle and a line number. The image data generation section 502 transmits image data as drive data associated with each beam to the dot position adjustment section 510.

The dot position adjustment section 510 comprises a writing start adjustment section 503 and a partial magnification adjustment section 504, and performs time adjustment on received image data on a beam-by-beam basis. In the present embodiment, dot position adjustment (correction of relative position between dots) is performed by controlling the time width of each pixel in a unit finer than one pixel to thereby shift a dot position in the main scanning direction. For example, in the case of performing the control by dividing one pixel into 20 pieces, data in $\frac{1}{20}$ pixel units (hereinafter referred to as "auxiliary pixels") is inserted or removed in or from image data corresponding to one desired pixel, whereby the lighting time width of each pixel is adjusted. The term "auxiliary pixel insertion/removal" refers to insertion (addition) or removal (extraction) of an auxiliary pixel to or from an image.

The writing start adjustment section 503 performs auxiliary pixel insertion/removal according to laser beam-specific writing start timing designated by the CPU 501. The partial magnification adjustment section 504 performs auxiliary pixel insertion/removal for each beam designated by the CPU 501 and on a divisional scanning area basis. The dot position adjustment section 510 generates image data having undergone auxiliary pixel insertion/removal as a drive signal, and transmits the image data as the drive signal to the semiconductor laser drive circuit 505. The semiconductor laser drive circuit 505 causes each of the light emitting elements of the semiconductor laser 401 to emit a laser beam, based on the received image data as the drive signal.

The polygon motor drive circuit 506 controls a polygon motor (not shown) based on an instruction from the CPU 501 such that the rotational speed of the polygon motor becomes a predetermined speed. The thermistor 507 is disposed within the light beam scanning device 104 to detect an ambient temperature in the light beam scanning device 104. The value of the detected temperature is read out by the CPU 501 via an analog-to-digital converter, not shown. The memory 509 stores dot position information D2 (described hereinafter with reference to FIG. 5B) associated with each beam and each main-scanning position. The dot position information D2 is read out by the CPU 501. The dot position information D2 is indicative of an exposure position shift amount associated with each beam and each main-scanning position, and is based on values of the exposure position shift amount measured in advance in a factory. The dot position information D2 associated with each beam and each main-scanning position is used as correction data for correcting an exposure position shift of each beam in the main scanning direction.

Next, a description will be given, with reference to FIGS. 4A and 4B, of an example of dot position adjustment in the main scanning direction, which is performed through writing start position adjustment for each beam and the partial magnification adjustment in each divisional main-scanning area.

Figure 4A:
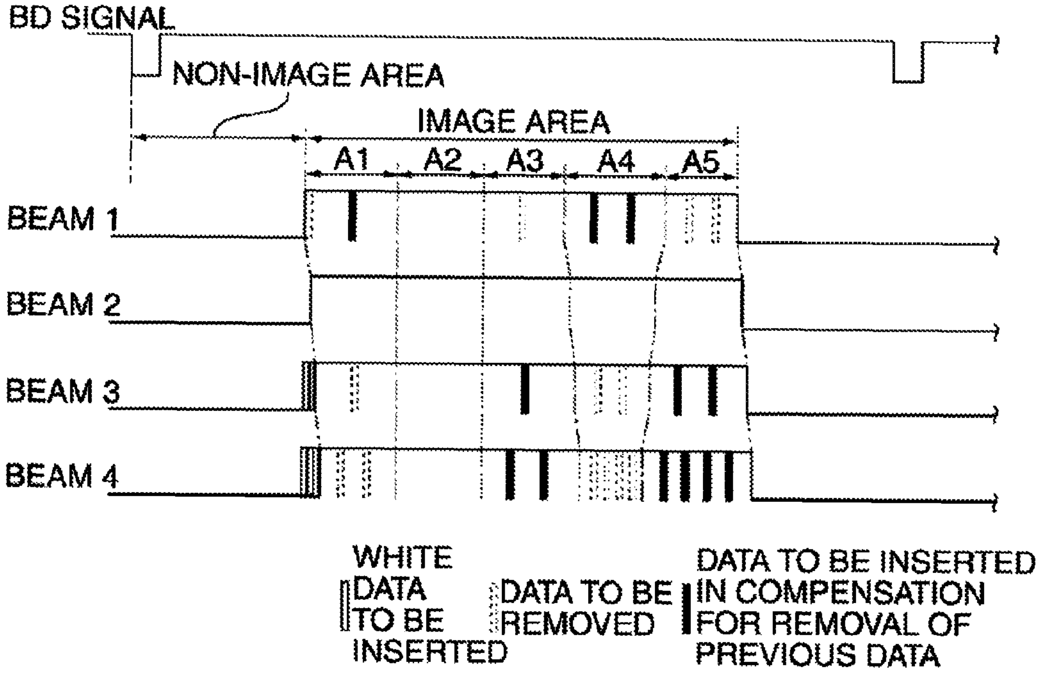
FIG. 4A is a timing diagram of insertion/removal of auxiliary pixels in/from images associated with respective beams.

FIG. 4A is a timing diagram useful in explaining adjustment of positions of pixels in main scanning areas A1, A2, A3, A4, and A5 by inserting image data corresponding to auxiliary pixels to image data of an image to be formed by each laser beam or deleting image data corresponding to auxiliary pixels from the same. FIG. 4B is a diagram showing the positional relationship between dots before and after adjustment by auxiliary pixel insertion/removal. In FIGS. 4A and 4B, the left side corresponds to an upstream side in the main scanning direction.

First, as shown in FIG. 4A, images are formed in image areas according to the laser beams 1, 2, 3, and 4, respectively. As shown in FIG. 4B, according to the concept of control for the adjustment, an image area in the main scanning direction in which the beams scan the surface of the photosensitive drum 102 is divided into a plurality of areas. In the present example, the image area is divided into five main-scanning areas A1, A2, A3, A4, and A5.

Figure 4B:
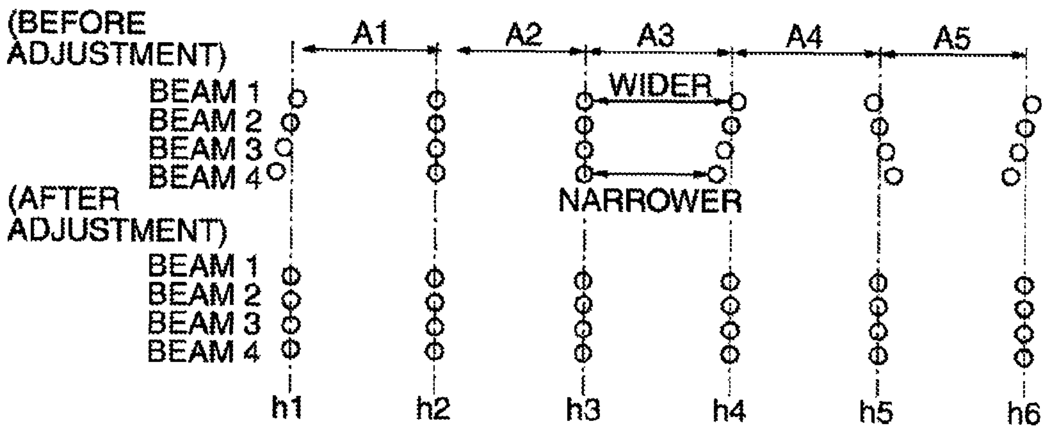
FIG. 4B is a diagram showing the positional relationship between dots before and after adjustment by auxiliary pixel insertion/removal.

As shown in FIG. 4B, positions in the main scanning direction are represented as main-scanning positions h (h1 to h6). In the present embodiment, the laser beams scan the surface of the photosensitive drum 102 from the main-scanning position h1 toward the main-scanning position h6, and therefore the right side in each of FIGS. 4A and 4*b* corresponds to a downstream side in the main scanning direction. Each of the main-scanning positions h corresponds to an upstream-side end of an associated one of the main-scanning areas A as divisional areas, in the main scanning direction. More specifically, each of the main-scanning areas A1 to A5 is a divisional area with an associated one of the main-scanning positions h1 to h5 as a leading position (upstream-side end position), and for example, an area from the main-scanning position h1 to the main-scanning position h2 corresponds to the main-scanning area A1.

A writing start position is a position in the main scanning direction where image writing is started when writing an electrostatic latent image on the photosensitive drum 102 by scanning a laser beam on the photosensitive drum 102. Therefore, the writing start positions of the respective main-scanning areas A1 to A5 are defined as the main-scanning positions h1 to h5, respectively, and the writing start position of the entire image is defined as the main-scanning position h1.

In the dot position adjustment, one of the four laser beams is set as a reference laser beam. Any one of the four laser beams may be set as the reference, but in the present embodiment, the laser beam 2 is set as the reference laser beam.

In the present embodiment, by auxiliary pixel insertion/removal, the leading position of each of the laser beams 1, 3, and 4 in each of the main-scanning areas A1 to A5 is aligned with that of the reference laser beam 2. In other words, the writing start positions of the respective laser beams 1, 3, and 4 are aligned with that of the laser beam 2. This is achieved by performing auxiliary pixel insertion/removal in the main-scanning areas A1 to A5 or in an upstream-side area adjacent to the main-scanning area A1. In the present example, since the dot position of the laser beam 2 is set as the reference position, auxiliary pixel insertion/removal is not performed on an image associated with the laser beam 2.

An auxiliary pixel corresponds to white data or black data. The white data corresponds to a laser-off state, and the black data corresponds to a laser-on state. An auxiliary pixel to be inserted is generated by copying an upstream-side adjacent pixel. When the adjacent pixel is black data, the auxiliary pixel to be inserted is determined as black data, and when the adjacent pixel is white data, the auxiliary pixel to be inserted is determined as white data.

Let it be assumed, in the writing start position adjustment for each laser beam, that the writing start timing (dot position at the main-scanning position h1) of the laser beam is shifted from that of the laser beam 2 in an advanced direction (leftward, as viewed in FIGS. 4A and 4B). In this case, one or more auxiliary pixels as white data are inserted in an upstream-side area adjacent to the main-scanning area A1. Specifically, the writing start timing is delayed by inserting the one or more auxiliary pixels as white data in the upstream-side area adjacent to the main-scanning area A1. This causes an entire image associated with the laser beam to be shifted toward a writing end side (downstream side).

On the other hand, when the writing start timing is shifted from that of the laser beam 2 in a delayed direction (rightward, as viewed in FIGS. 4A and 4B), one or more auxiliary pixels are removed from the upstream-side area adjacent to the main-scanning area A1. Specifically, the writing start timing is advanced by removing the one or more auxiliary pixels from the upstream-side area adjacent to the main-scanning area A1. This causes the entire image associated with the laser beam to be shifted toward a writing start side (upstream side).

For example, in an example shown in FIG. 4B, the writing start timing of each of the laser beams 3 and 4 is advanced with respect to that of the laser beam 2, and therefore one or more auxiliary pixels as white data are inserted in the upstream-side area adjacent to the main-scanning area A1. On the other hand, the writing start timing of the laser beam 1 is delayed with respect to that of the laser beam 2, and therefore one or more auxiliary pixels as white data are removed from the upstream-side area adjacent to the main-scanning area A1, whereby an image associated with the laser beam 1 is shifted toward the writing start side. By performing the writing start position adjustment as described above, the writing start end-side dot positions of the respective laser beams 1, 3, and 4 in the image area are adjusted, whereby the writing start positions of the respective laser beams 1, 3, and 4 are aligned with that of the laser beam 2.

In the partial magnification adjustment in each of the main-scanning areas as the divisional areas, auxiliary pixel insertion/removal is performed in each of the main-scanning areas A1 to A5 associated with the respective laser beams, whereby magnification adjustment is performed. More specifically, when an area width associated with a laser beam is smaller than an area width associated with the laser beam 2, the area width is increased by auxiliary pixel insertion. On the other hand, when an area width associated with a laser beam is larger than that associated with the laser beam 2, the area width is reduced by auxiliary pixel removal.

For example, in the example shown in FIG. 4B, the main-scanning area A3 associated with the laser beam 1 has a larger area width, so that the magnification is reduced by auxiliary pixel removal. On the other hand, the main-scanning area A3 associated with the laser beam 4 has a smaller area width, so that the magnification is increased by auxiliary pixel insertion.

As a consequence, the main-scanning areas A associated with the laser beams 1 and 4 downstream of the main-scanning area A3 are shifted toward the writing start side (upstream side) and the writing end side (downstream side), respectively, so that the writing start positions of the respective laser beams on the upstream side of the main-scanning areas A4 are aligned with each other.

Incidentally, the writing start position adjustment and the partial magnification adjustment are performed substantially by aligning the dot positions of respective laser beams in the main scanning direction in each of the main-scanning positions h with that of a reference laser beam. Increasing or reducing the area width of a main-scanning area A as a divisional area causes shifting of the write start position of a downstream-side main-scanning area A adjacent thereto in a delaying or advancing direction, respectively.

Further, in each of the main-scanning areas A downstream of the position where auxiliary pixel insertion/removal is performed for the writing start position adjustment and the partial magnification adjustment, the writing start position is shifted by the number of inserted/removed pixels unless further adjustment is performed. For this reason, in the partial magnification adjustment in each of the main-scanning areas A, the number of auxiliary pixels to be inserted or removed is determined by counting the number of auxiliary pixels to be inserted or removed so as to increase or reduce an area width and further taking into account the number of auxiliary pixels to be inserted or removed so as to cancel out a shift of dot position caused by auxiliary pixels inserted or removed in an upstream-side main-scanning area A.

The laser beam 1 in FIGS. 4A and 4B is taken as an example. In the partial magnification adjustment for the laser beam 1 in the main-scanning area A1, since there is no exposure position (dot position) shift at the main-scanning position h2, the number of auxiliary pixels to be inserted or removed for dot position correction (exposure position correction) at the main-scanning position h2 is equal to 0. However, since one auxiliary pixel has been removed from the upstream-side area adjacent to the main-scanning area A1, each of the main-scanning areas A1 to A5 is shifted toward the writing start position side (i.e. upstream). Therefore, without further adjustment, the dot position at the main-scanning position h2 remains shifted upstream. To eliminate this inconvenience, one auxiliary pixel is inserted in the main-scanning area A1 to cancel out the shift caused by the auxiliary pixel removal. This prevents the dot position from being shifted at the main-scanning position h2, as shown in FIG. 4B, and the area width of the main-scanning area A1 becomes equal to that associated with the laser beam 2.

In the partial magnification adjustment for the laser beam 1 in the main-scanning area A4, to correct an upstream shift of the dot position at the main-scanning position h5, it is required to insert one auxiliary pixel to correct the upstream shift of the dot position. However, one auxiliary pixel has been removed from the upstream-side main-scanning area A3 adjacent to the main-scanning area A4, and hence each of the main-scanning areas A4 and A5 is shifted toward the writing start position side (i.e. upstream). Therefore, without further adjustment, the dot position at the main-scanning position h5 remains shifted upstream. To eliminate this inconvenience, in addition to the insertion of one auxiliary pixel in the main-scanning area A4 made to correct the upstream shift of the dot position at the main-scanning position h5, one auxiliary pixel is inserted so as to cancel out the shift caused by the auxiliary pixel removed in the upstream-side main-scanning area A3. This prevents the dot position from being shifted at the main-scanning position h5, as shown in FIG. 4B, and the area width of the main-scanning area A4 becomes equal to that associated with the laser beam 2.

Note that an exposure position (i.e. a position on the writing start side in each of the main-scanning areas A) before correction is identified based on BD (beam detection) timing. Further, insofar as the other beams than the reference beam are concerned, the writing start position and the partial magnification are corrected based on the dot position information D2.

Next, a description will be given, with reference to FIGS. 5A to 5D, of data stored in the memory 509.

Figures 5A, 5B, 5C, 5D:
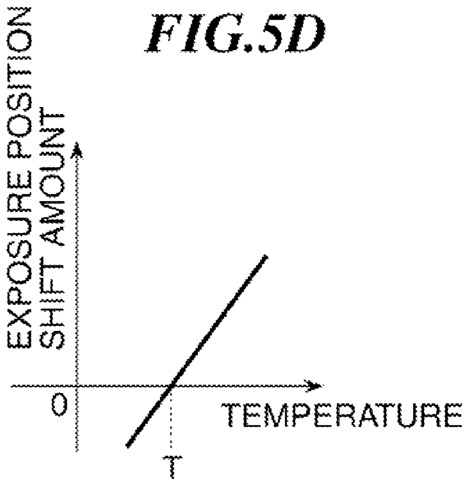
FIG. 5A is a table showing dot position information on relative dot positions in respective main-scanning positions.
FIG. 5B is a table showing dot position information associated with the laser beams in the respective main-scanning positions.
FIG. 5C is a table showing dot position inclination information as dot position information in each main-scanning position.
FIG. 5D is a diagram showing the relationship between temperature and the amount of exposure position shift.

FIG. 5A is a table showing dot position information D1 on relative dot positions in the respective main-scanning positions h1 to h6. FIG. 5B is a table showing the dot position information D2 on dot positions associated with the respective laser beams in the respective main-scanning positions h1 to h6. The dot position information D1 and the dot position information D2 are stored in advance in the memory 509. FIGS. 5C and 5D will be described hereinafter.

The dot position information D1 is obtained in advance by measurement in a factory, and stores only the amount of a relative exposure position shift between predetermined two laser beams (the laser beams 1 and 4 corresponding to the opposite ends in the sub scanning direction) in each of the main-scanning positions h1 to h6. Specifically, the dot position information D1 is indicative of the relative exposure position shift amount (phase μm) of the laser beam 4 with respect to the laser beam 1. Now, the position number of each main-scanning position h is generically represented by "i", and the beam number of each laser beam by "j". Further, the relative exposure position shift amount of the laser beam 4 with respect to the laser beam 1 in a main-scanning position "$h_i$", is represented by "$m_i$".

The dot position information D2 shown in FIG. 5B stores an exposure position shift amount $p_{ij}$ indicative of an exposure position shift of each laser beams j with respect to the laser beam 2 in each main-scanning position $h_i$. The information is used as correction data. For example, the exposure position shift amount of the laser beam 1 at the main-scanning position h2 is $P_{21}$. The CPU 501 calculates the exposure position shift amount $p_{ij}$ at the main-scanning position $h_i$ using the following equation (1).

$$p_{ij}=(m_i \div L)\times(j-r) \quad (1)$$

In the equation (1), L is determined from the respective beam numbers of laser beams based on which relative exposure position shift amount information is determined in the dot position information D1. In the present example, the laser beams 1 and 4 are used for the dot position information D1, and L is equal to 3 (L=4−1=3). The value of the term ($m_i$÷L) corresponds to the amount of shift between adjacent laser beams. The symbol r represents the beam number of a reference laser beam (2 in the present example). The value of the term ($m_i$÷L) is multiplied by the value of the term (j−r), whereby the amount of shift between the reference laser beam and a target laser beam is obtained. A reference laser beam refers to a laser beam as a reference for determining an exposure position shift. Therefore, an exposure position shift amount associated with the laser beam 2 as the reference laser beam in the present example is always equal to 0.

The exposure position shift amounts $m_i$ and $p_{ij}$ are stored with sufficiently higher accuracy than units of control of auxiliary pixels by the image forming apparatus 100. For example, in a case where each unit of control of an auxiliary pixel (auxiliary pixel control unit) can be controlled in a range of 1 μm, the values are stored up to the first decimal place of μm so as to make the control invulnerable to error. In the present embodiment, for simplicity of explanation, it is assumed that the amount of relative shift of an exposure position due to assembly variations of the image forming apparatus 100 is 12 μm or smaller.

In the present embodiment, bits necessary for dot position information are one bit for a sign, four bits for an integer part, and four bits for a decimal part, i.e. a total of nine bits. As for the integer part, the maximum value is equal to 12, and hence it is necessary and sufficient to have four bits with which 0 to 15 can be expressed. As for the decimal part, it is necessary to take it into consideration that in general, when a decimally expressed value is converted to a binary number, the value is rounded according to the number of bits. For example, if the decimal part is formed by 2 bits, the value is rounded to a value in units of $\frac{1}{2}^2$ (1/(2 to the power of 2))=0.25.

As a result, a value is rounded to a number as a multiple of 0.25 and closest to the original number, such that 0.7 is rounded up to 0.75 and 0.3 is rounded off to 0.25. Therefore, in order to make the control invulnerable to error, the number of bits is required for the decimal part, which is larger by one digit than the number of bits forming units to required accuracy. Values rounded according to the number of bits are shown below.

1 bit → 0.5 = $1/(2^1)$ 2 bits → 0.25 = $1/(2^2)$ 3 bits → 0.125 = $1/(2^3)$ 4 bits → 0.0625 = $1/(2^4)$ 5 bits → 0.3125 = $1/(2^5)$ 6 bits → 0.15625 = $1/(2^6)$ 7 bits → 0.0078125 = $1/(2^7)$

. . .

16 bits → 0.0000153 . . . = $1/(2^{16})$ 17 bits → 0.0000076 . . . = $1/(2^{17})$ From these, it is understood that to make dot position information effective up to the first decimal place, it is required to round the dot position information at the second decimal place, which means that four-bit data which provides units of 0.0625 is needed. Further, even in an image forming apparatus different in auxiliary pixel accuracy or design information, it is easy to determine the optimal number of necessary bits based on the above-mentioned principle.

As a result of the above-described calculation, the dot position information D2, shown in FIG. 5B, in association with each main-scanning position and each laser beam is derived from the relative dot position information D1 shown in FIG. 5A.

Next, a description will be given of a method of calculating a dot position correction amount associated with each main-scanning position and each laser beam.

First, a writing start position adjustment amount associated with each beam is calculated. The size of an auxiliary pixel is represented by Sp, and the number of auxiliary pixels inserted in or removed from an upstream-side area adjacent to the main-scanning position h1 in association with the laser beam j is represented by $b_{1j}$. When the number of auxiliary pixels inserted or removed (auxiliary pixel insertion/removal number) $b_{1j}$ has a plus sign, it indicates pixel insertion, whereas when the same has a minus sign, it indicates pixel removal. The auxiliary pixel insertion/removal number $b_{1j}$ is calculated by the following equation (2):

$$b_{1j}=p_{1j}\div Sp\text{(rounded off to an integer)} \quad (2)$$

Auxiliary pixels are inserted in or removed from each of the upstream-side areas adjacent to the writing start positions i.e. the main-scanning positions h1 of the respective laser beams 1, 3, and 4, by an associated auxiliary pixel insertion/removal number $b_1$, whereby the writing start positions of the respective laser beams 1, 3, and 4 are aligned with that of the laser beam 2.

Next, the dot position adjustment for each laser beam in the main scanning direction is performed in each of the following main-scanning positions h including the next main-scanning position h2. The auxiliary pixel insertion/removal number associated with the laser beam j for an upstream-side main-scanning area A adjacent to each main-scanning position h is represented by $b_{ij}$, the temperature coefficient of the f-θ lens 406 by α, and the amount of change in temperature from a temperature measured in a factory by ΔT. The auxiliary pixel insertion/removal number $b_{ij}$ is calculated by the following equation (3):

$$b_{ij}=(b_{ij}-b_{1j}\times Sp+\alpha\times\Delta T)/Sp \quad (3)$$

For example, in each of the upstream-side main-scanning area A1 adjacent to the main-scanning positions h2 associated with the respective laser beams 1, 3, and 4, auxiliary pixels are inserted or removed by a number corresponding to an associated one of auxiliary pixel insertion/removal numbers $b_{21}$, $b_{23}$, and $b_{24}$, whereby the dot positions of the respective laser beams 1, 3, and 4 at the main-scanning position h2 are aligned with that of the laser beam 2.

The temperature coefficient α is determined based on the environmental temperature-dependent shift characteristic of a dot position. When a temperature under which measurement is performed in a factory is represented by T and a dot position in the temperature T is set as an initial value, the dot position changes according to changes in the temperature as shown in FIG. 5D. Since the temperature coefficient α is substantially constant irrespective of each of the main-scanning positions h, the same value is added for each main-scanning position h, as expressed in the equation (3). Further, the temperature coefficient α is different depending on the arrangement of an optical system, and in the present embodiment, a typical characteristic value obtained by experiment is used for calculation.

The change amount ΔT is determined based on a difference between the factory measurement-time temperature T and an ambient temperature detected by the thermistor 507. When the temperature rises, the dot position shifts upstream, and therefore a positive sign of the change amount ΔT indicates an upstream shift. Thus, the term "α×ΔT" corresponds to an image shift amount provided to cancel out the amount of an upstream shift due to an increase in the temperature.

Further, insertion/removal of auxiliary pixels in/from the upstream-side area adjacent to the main-scanning position h1 causes the leading position (main-scanning position h2) of the main-scanning area A2 to shift downstream/upstream. The term "$b_{1j}$×Sp" corresponds to an image shift amount provided to cancel out the shift amount of the leading position.

Next, a description will be given of control in which the writing start position adjustment for each laser beam and the partial magnification adjustment in each main-scanning area are performed during a print job (JOB) execution process.

Figure 6:
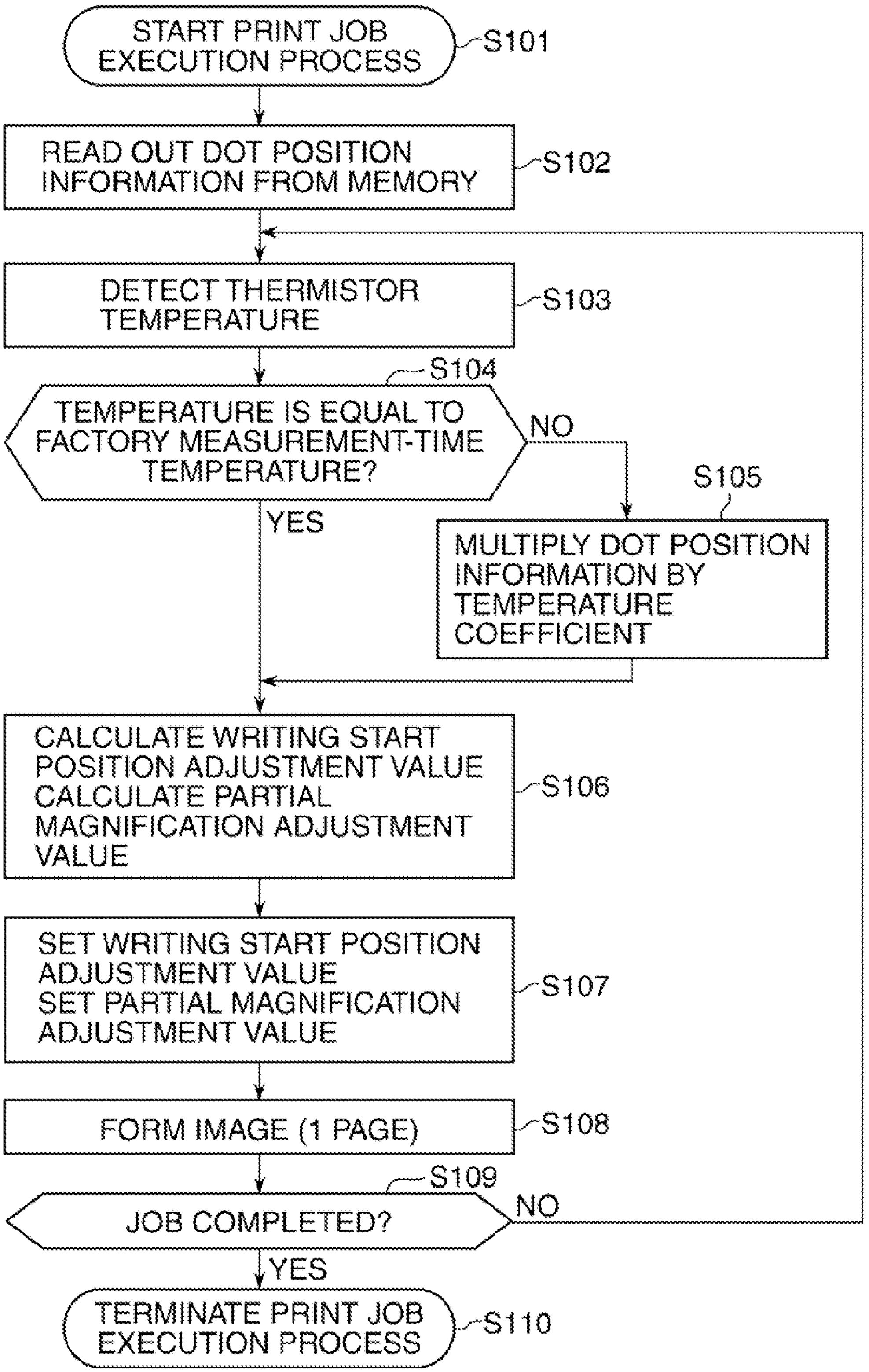
FIG. 6 is a flowchart of a print job execution process.

FIG. 6 is a flowchart of the print job execution process.

The CPU 501 receives an instruction for executing a print job and starts the print job in a step S101. In a step S102, the CPU 501 reads out the dot position information D2 (see FIG. 5B) from the memory 509. In a step S103, the CPU 501 reads out a detection value of the ambient temperature from the thermistor 507.

In a step S104, the CPU 501 determines whether or not the detection value read out from the thermistor 507 is equal to a factory measurement-time temperature. The factory measurement-time temperature here refers to a temperature under which measurement was performed in a factory to obtain the dot position information D1 (see FIG. 5A) stored in the memory 509. Further, it is assumed that the temperature of an environment for measurement in the factory is controlled such that the factory measurement-time temperature is always constant, and the CPU 501 compares between the known temperature controlled in the factory, i.e. the factory measurement-time temperature and a result of detection by the thermistor 507, and performs determination based on a result of the comparison.

If the detection value read out from the thermistor 507 is equal to the factory measurement-time temperature, the CPU 501 causes the process to proceed to a step S106. On the other hand, if the two temperatures are different from each other, the CPU 501 causes the process to proceed to a step S105, wherein a value obtained by multiplying the dot position information D2 by the temperature coefficient $\alpha$ is set as new dot position information D2.

In the step S106, the CPU 501 calculates the writing start position adjustment value and the partial magnification adjustment value based on the dot position information D2 which is correction data. The writing start position adjustment value is the auxiliary pixel insertion/removal number $b_{1j}$ mentioned hereinabove and is obtained by the equation (2). The partial magnification adjustment value is the auxiliary pixel insertion/removal number $b_{ij}$ mentioned hereinabove and is obtained by the equation (3).

In a step S107, the CPU 501 sets the writing start position adjustment value (auxiliary pixel insertion/removal number $b_{1j}$) in the writing start adjustment section 503 of the dot position adjustment section 510 shown in FIG. 3 and the partial magnification adjustment value (auxiliary pixel insertion/removal number $b_{ij}$) in the partial magnification adjustment section 504 of the same.

In a step S108, the CPU 501 forms a one-page image in a state where the dot position adjustment has been completed. More specifically, the image is formed with the writing start position adjustment value and the partial magnification adjustment value set in the dot position adjustment section 510. At this time, auxiliary pixel insertion/removal is performed according to the adjustment values, as shown, by way of example, in FIGS. 4A and 4B.

Generation of drive data and a drive signal and output of the adjustment values are performed on a light emitting element basis. Specifically, the CPU 501 generates drive data for each of the light emitting elements of the semiconductor laser 401 based on input image data. Further, for the light emitting element that emits the reference laser beam 2, the CPU 501 generates an associated drive signal based on the drive data. For each of the other light emitting elements than the reference light emitting element, the CPU 501 generates an associated drive signal based on the drive data and the adjustment values. Then, based on the generated drive signal, the CPU 501 controls the semiconductor laser drive circuit 505 such that the semiconductor laser drive circuit 505 drives the light emitting elements to emit the respective laser beams.

Then, in a step S109, the CPU 501 determines whether or not the print job has been completed. If the print job has not been completed, the process returns to the step S103, whereas if the print job has been completed, the print job execution process is terminated (step S110).

In the present embodiment, in the steps S103 to S105, the dot position adjustment is performed based on a temperature detection value on a page-by-page basis, but when the rising speed of the temperature within the image forming apparatus 100 is slow, the frequency of the detection may be reduced. Therefore, the processing corresponding to the steps S103 to S105 may be executed once per a plurality of pages.

Further, in an image forming apparatus in which the temperature hardly changes or when the amount of an exposure position shift due to a change in the temperature is negligibly small, it is not required to perform temperature detection. When the temperature detection is not required, the processing in the steps S103 to S105 can be omitted. In this case, in the step S106, the CPU 501 calculates the adjustment values based on the dot position information D2 read out in the step S102.

Thus, even when dot positions shift within a scanning surface e.g. due to field curvature, it is possible to perform dot position adjustment in the entire image area using the adjustment values, to thereby prevent occurrence of moiré. When the field curvature characteristic has variation between individual light beam scanning devices 104 (individual variation), exposure position shift amounts measured on an individual light beam scanning device 104 in advance in the factory are stored in the memory 509 and adjustment is performed based thereon. This makes it possible to cancel out the exposure position shift due to an individual variation caused by variation in component parts or variation in assembly work which occurs during manufacturing of the apparatus.

In the present embodiment, the dot position information D1 (see FIG. 5A) is assumed to be information storing phases of the laser beam 1 and the laser beam 4. However, this is not limitative, but inclination information k on dot positions in the respective main-scanning positions h may be stored as dot position information D1, as shown in FIG. 5C. The inclination information k is indicative of an amount obtained by dividing the amount of an exposure position shift in the main scanning direction between opposite-end laser beams of a plurality of laser beams arranged in the sub scanning direction by the number of the laser beams.

On the other hand, when the individual variation is small, the dot position adjustment may be performed based on typical exposure position shift information. In this case, it is not required to provide a memory in the light beam scanning device, and the CPU 501 performs the dot position adjustment based on predetermined exposure position shift information.

According to the present embodiment, drive signals associated with the respective light emitting elements other than the reference light emitting element are generated based on the dot position information D2 (see FIG. 5B) as correction data for use in dot (exposure) position shift correction in the main scanning direction. Therefore, it is possible to properly correct exposure position shift between the laser beams to thereby suppress occurrence of moiré or like harmful effects on an image.

In particular, the correction data is output in association with each main-scanning position h or each main-scanning area A, so that correction can be performed in each of the divisional areas and even when the exposure position shift amount is different depending on a position in the main scanning direction, proper adjustment can be performed. This makes it possible to suppress occurrence of moiré or like harmful effects on an image in each of the image areas.

Further, in the equation (3), the auxiliary pixel insertion/removal number $b_{ij}$ reflects "$\alpha \times \Delta T$", and correction data is corrected based on a detected environmental temperature. This makes it possible to perform adjustment according to exposure position shift due to a change in the environmental temperature, to thereby cancel out the amount of shift due to the temperature change.

In the present embodiment, dot position adjustment is performed by inserting or removing one or more auxiliary pixels on a laser beam basis to thereby adjust a writing start position and a partial magnification associated with each laser beam. However, when an exposure position shift in each writing start position is very small, only the function of adjusting the partial magnification on a laser beam basis may be provided. Alternatively, a clock control unit, such as a PLL (phase locked loop), may be used for performing the start position adjustment by phase control and the partial magnification adjustment by frequency modulation of an image clock. In this case, the transfer clock (image clock) of image data transferred from the image data generation section 502 to the semiconductor laser drive circuit 505 is phase-adjusted by the writing start adjustment section 503. Further, area-specific frequency modulation is performed by the partial magnification adjustment section 504, whereby light emission timing is adjusted.

Next, a second embodiment of the present invention will be described. In the second embodiment, dot position information is switched between mirror surfaces which are reflecting surfaces of the polygon mirror 405 to thereby adjust variation in dot position on a mirror surface basis. The second embodiment will be described using FIG. 7 and FIGS. 8A and 8B in place of FIGS. 3 and 6 with reference to which the first embodiment was described.

Figure 7:
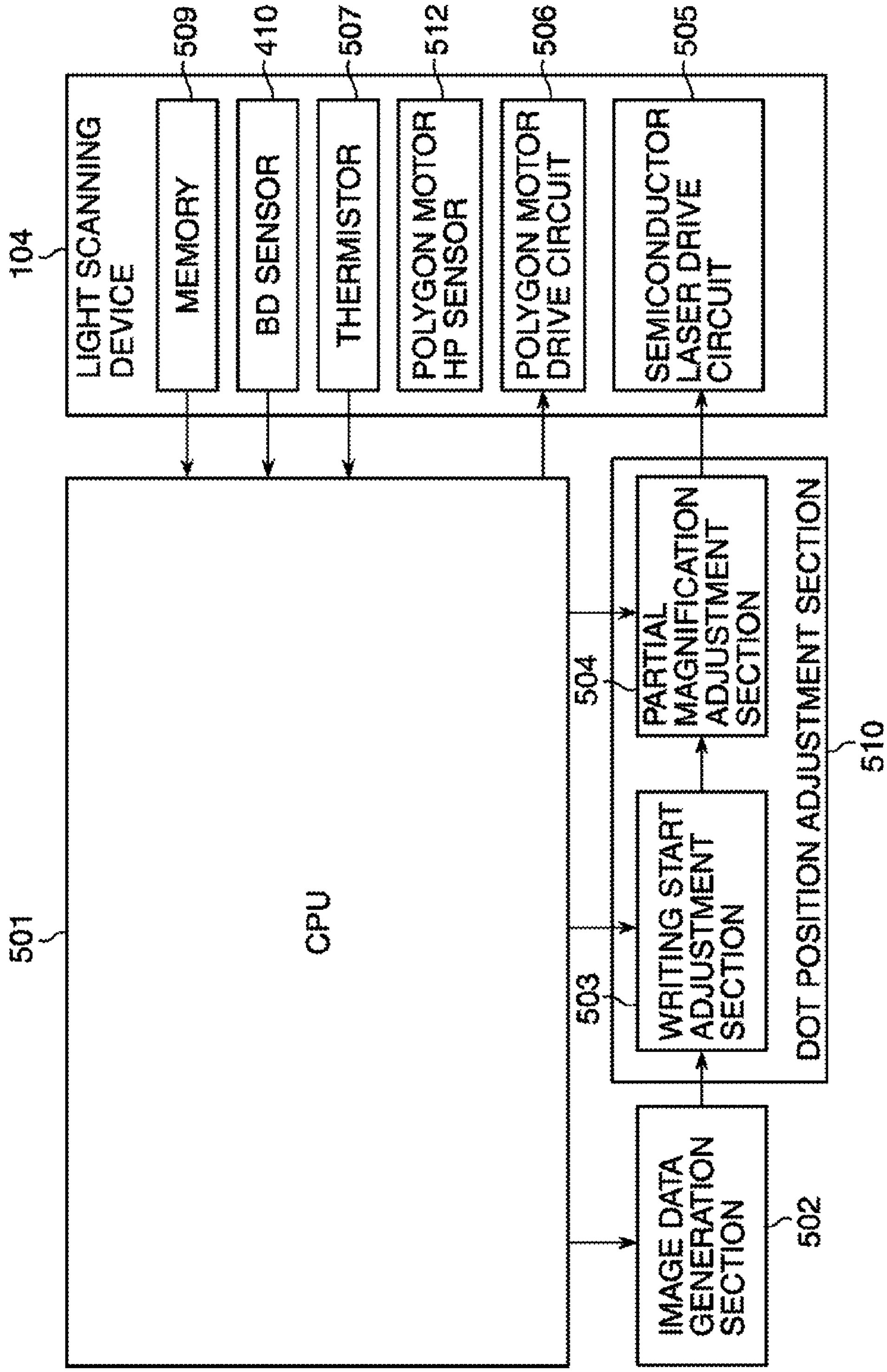
FIG. 7 is a diagram of a control block of an image forming apparatus according to a second embodiment of the present invention, which performs dot position adjustment.

FIG. 7 is a diagram of a control block of an image forming apparatus 100 according to the second embodiment, which performs dot position adjustment. The control block in the present embodiment is distinguished from the control block (see FIG. 3) in the image forming apparatus 100 according to the first embodiment in that a polygon motor home position sensor 512 (identification unit) is added. The other configuration of the control block is the same as that in the first embodiment.

The polygon motor home position sensor (hereinafter referred to as "the polygon motor HP sensor") 512 is configured to irradiate an upper portion of the rotary part of a polygon mirror 405 with light, and monitor reflected light therefrom. A predetermined portion of the upper portion of the rotary part of the polygon mirror 405 is coated with a reflective material for reflecting light, whereby a reflected light is detected whenever the polygon mirror 405 passes a predetermined rotational position. The reflective material is applied to only one predetermined portion, so that a signal is output once per one rotation of the polygon mirror 405.

The CPU 501 detects a signal from the polygon motor HP sensor 512 to thereby detect timing in which the polygon mirror 405 passes the predetermined position. Thereafter, the CPU 501 detects an output (synchronization signal) from the BD sensor 410 to thereby always grasp the rotation phase of each mirror surface. This enables the CPU 501 to identify a mirror surface which is to receive the respective laser beams 1, 2, 3, and 4, from a plurality of mirror surfaces.

In the present embodiment, writing start position adjustment values and partial magnification adjustment values are set in association with each of the mirror surfaces of the polygon mirror 405. The memory 509 stores the dot position information D2, shown in FIG. 5B, in association with each of the mirror surfaces. The dot position information D2 is read out by the CPU 501, as in the first embodiment, and the writing start position adjustment values and the partial magnification adjustment values are calculated on a mirror surface basis. Note that adjustment values associated with a mirror surface to be used for scanning next are set in a non-image area.

Next, a description will be given of control in which the writing start position adjustment for each laser beam and the partial magnification adjustment in each main-scanning area are performed during a print job execution process.

Figure 8A:
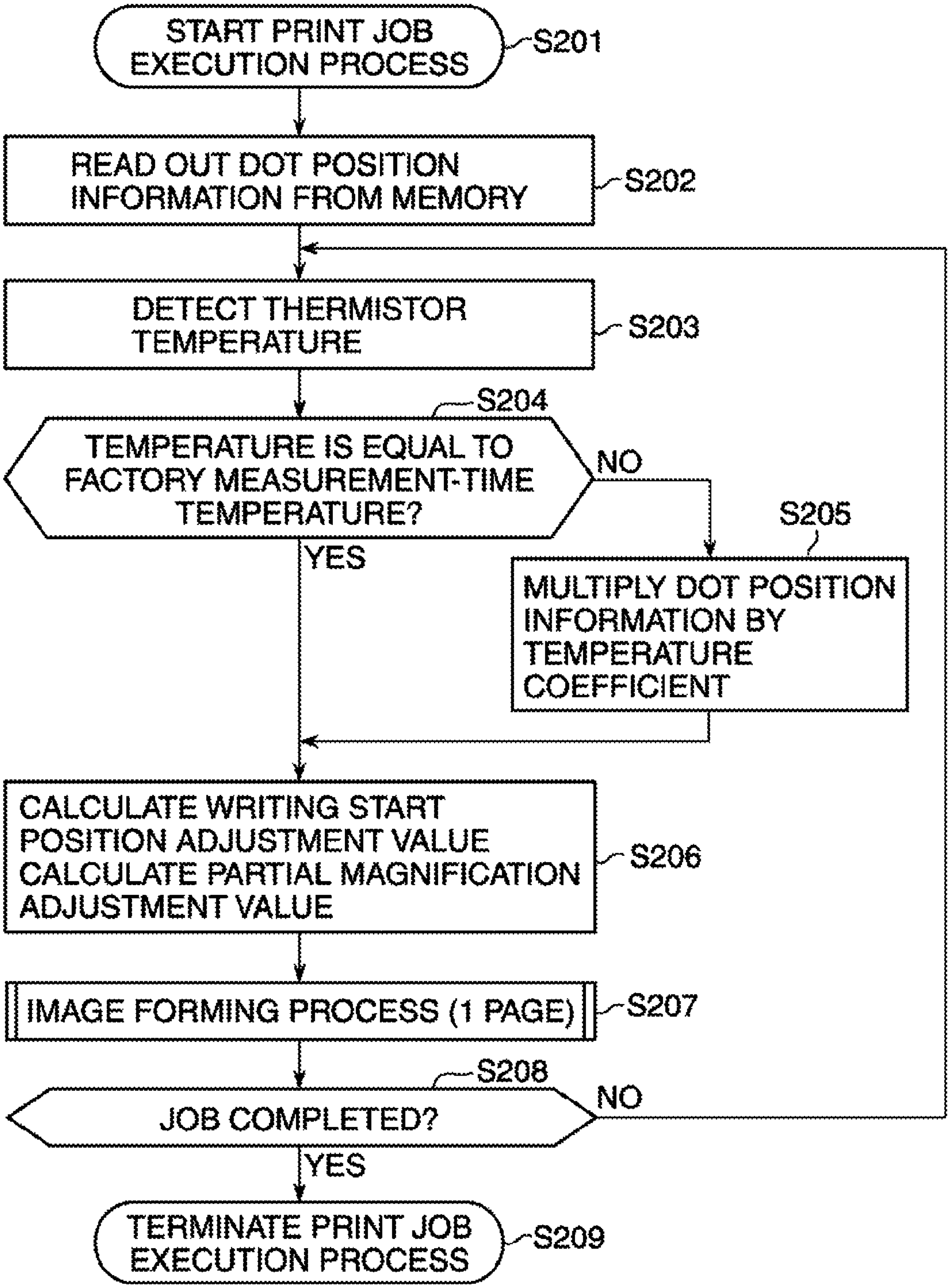
FIG. 8A is a flowchart of a print job execution process executed in the second embodiment.

FIG. 8A is a flowchart of the print job execution process executed in the second embodiment.

Figure 8B:
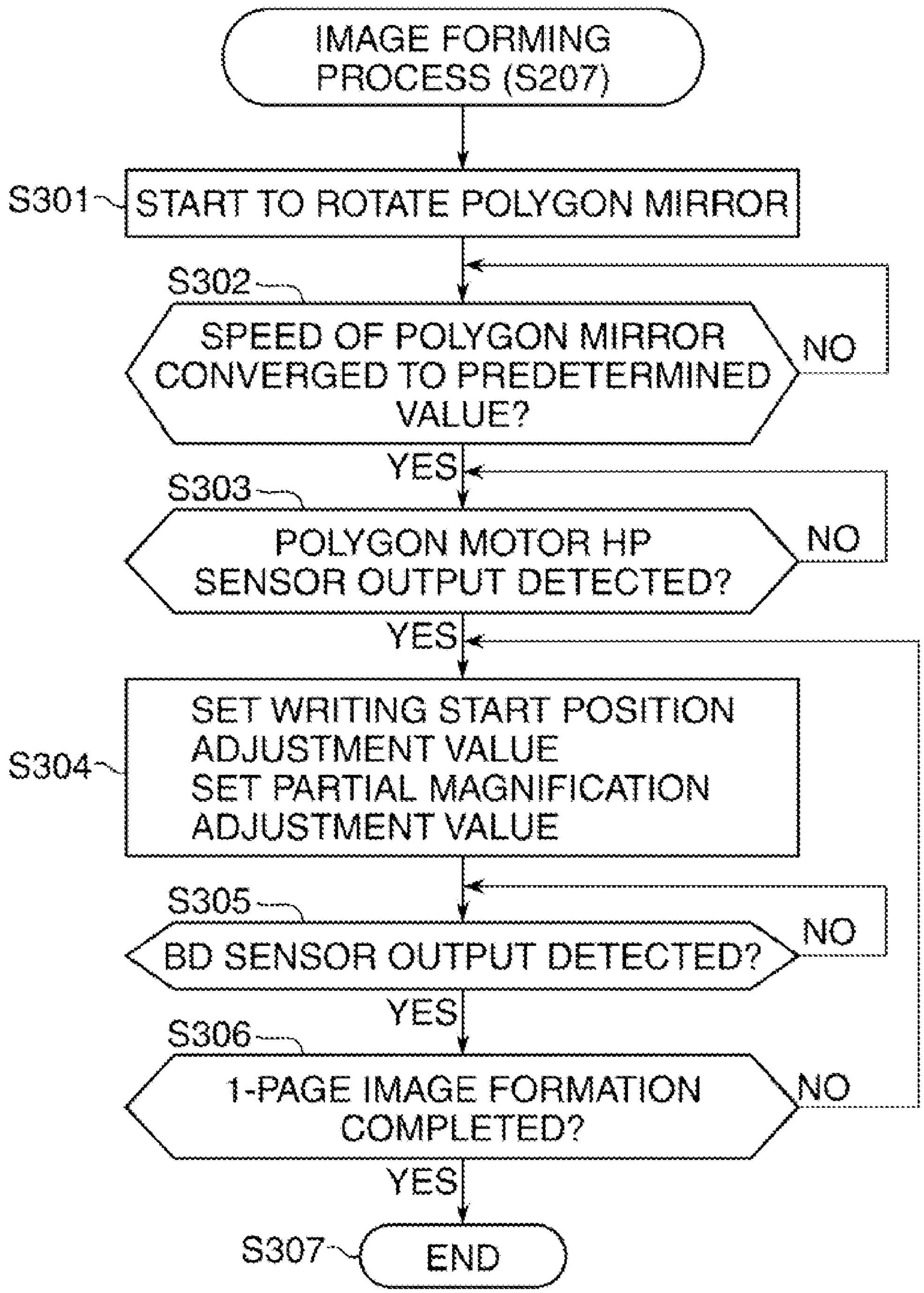
FIG. 8B is a flowchart of an image forming process executed in a step of FIG. 8A.
Figure 9A:
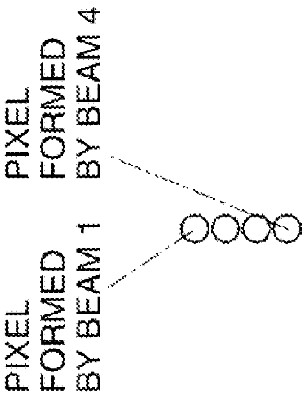
FIGS. 9A to 9C are views showing the relationship between focus position shift and exposure position shift.
Figure 9B:
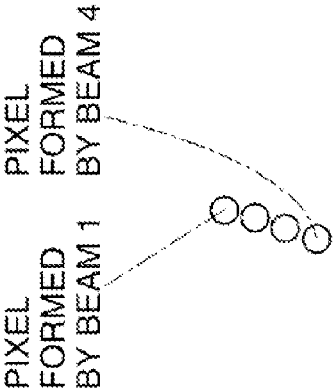
Figure 9C:
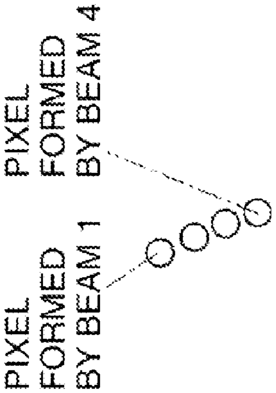
Figure 9D:
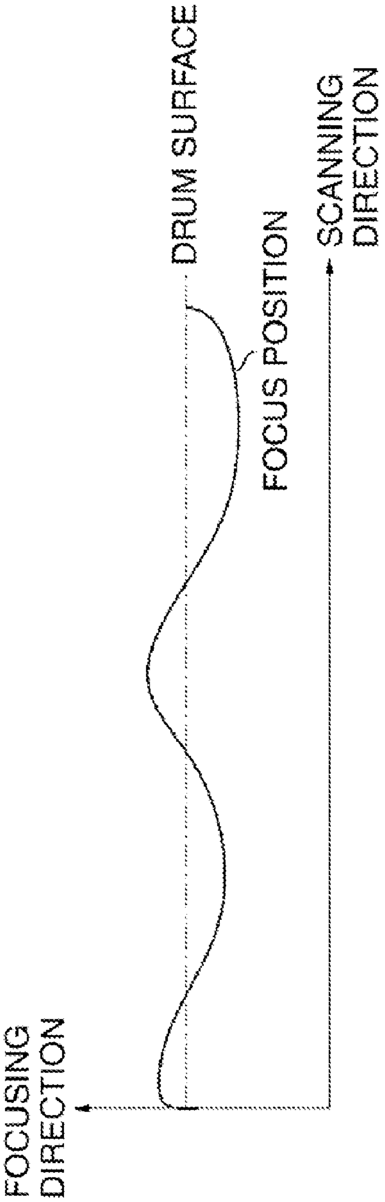
FIG. 9D is a diagram showing the relationship between the focus position of a laser beam of a light beam scanning device and a drum surface.

FIG. 8B is a flowchart of an image forming process executed in a step S207 of FIG. 8A.

In steps S201 to S206, the CPU 501 executes the same processing as in the steps S101 to S106 of FIG. 6. Particularly in the step S206, the writing start position adjustment values and the partial magnification adjustment values are calculated in association with the respective mirror surfaces of the polygon mirror 405.

In the step S207, the CPU 501 executes the image forming process in FIG. 8B to thereby form a one-page image while setting adjustment values according to each mirror surface of the polygon mirror 405. In steps S208 and S209, the CPU 501 executes the same processing as in the steps S109 and S110 of FIG. 6.

In a step S301 in FIG. 8B, the CPU 501 issues an instruction for starting to rotate the polygon mirror 405. In a step S302, the CPU 501 determines whether or not the rotational speed of the polygon mirror 405 has converged to a predetermined value. If the rotational speed has converged to the predetermined value, the CPU 501 proceeds to a step S303.

In the step S303, the CPU 501 determines whether or not an output from the polygon motor HP sensor 512 has been detected. If the output has been detected, the CPU 501 proceeds to a step S304. This means that in timing in which the output from the polygon motor HP sensor 512 is detected, the rotation phase of a mirror surface is detected, and then a mirror surface to be used for scanning next is identified.

In the step S304, the CPU 501 sets adjustment values selected from the writing start position adjustment values and the partial magnification adjustment values calculated in the step S206 of FIG. 8A, as values associated with the mirror surface identified as the mirror to be used for scanning next. More specifically, in association with the identified mirror surface, the CPU 501 sets the writing start position adjustment value (auxiliary pixel insertion/removal number $b_{1j}$) in the writing start adjustment section 503 of the dot position adjustment section 510 and the partial magnification adjustment value (auxiliary pixel insertion/removal number $b_{ij}$) in the partial magnification adjustment section 504 of the same. Then, the CPU 501 performs image formation with the writing start position adjustment value and the partial magnification adjustment value set in the dot position adjustment section 510. At this time, auxiliary pixels are inserted or removed by a number corresponding to each of the adjustment values, as shown, by way of example, in FIGS. 4A and 4B.

In a step S305, the CPU 501 determines whether or not an output from the BD sensor 410 has been detected. Here, the CPU 501 detects an output from the BD sensor 410 to thereby detect switching between mirror surfaces and identify a mirror to be used for scanning next. If an output from the BD sensor 410 has been detected, the CPU 501 causes the process to proceed to a step S306.

In the step S306, the CPU 501 determines whether or not one-page image formation has been completed. If the one-page image formation has been completed, the image forming process is terminated (step S307). On the other hand, if the one-page image formation has not been completed, the process returns to the step S304. In this case, e.g. when the polygon mirror 405 has six mirror surfaces, the BD signal is output six times per one rotation of the polygon mirror 405, and therefore, whenever the BD signal is received six times, adjustment values for the first mirror surface are set.

According to the present embodiment, dot positions are adjusted in association with each of the mirror surfaces of the polygon mirror 405. The flatness of a mirror surface of the polygon mirror 405 can be lost due to manufacturing variation, resulting in an evenness of the mirror surface. In such a case, the optical paths of scanning laser beams are diverted on the mirror surface, which causes variation in dot position on a mirror surface basis. However, in the present embodiment, it is possible to cancel out a dot (exposure) position shift irrespective of such unevenness of the mirror surfaces. Therefore, the second embodiment can provide the same advantageous effects as provided by the first embodiment in that it is possible to properly correct exposure position shift between laser beams to thereby suppress occurrence of moiré or like harmful effects on an image. Moreover, in the second embodiment, it is possible to adjust variation in dot position on a mirror surface basis.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2012-101251 filed Apr. 26, 2012, and Japanese Patent Application No. 2013-084762 filed Apr. 15, 2013, which are hereby incorporated by reference herein in their entirety.

What is claimed is:

1. An image forming apparatus comprising:

a photosensitive member configured to be rotatable;

a light source including a first light emitting element configured to emit a first light beam and a second light emitting element configured to emit a second light beam and configured to form an electrostatic latent image corresponding to an image to be formed on a recording medium, on the photosensitive member, the first light emitting element and the second light emitting element being arranged such that the first light beam and the second light beam expose different positions on the photosensitive member in a rotation direction of the photosensitive member;

a deflection unit configured to deflect the first light beam and the second light beam emitted from the light source such that the first light beam and the second light beam scan the photosensitive member;

a lens configured to guide the first light beam and the second light beam deflected by the deflection unit to the photosensitive member;

an image data generation unit configured to generate first image data corresponding to the first light emitting element and second image data corresponding to the second light emitting element based on an input image data;

an output unit configured to output a first correction data corresponding to a first area on the photosensitive member and a second correction data corresponding to a second area on the photosensitive member different from the first area in a scanning direction of the first light beam and the second light beam, and each of the first correction data and the second correction data is used for correcting a length of image formed by the second light beam for each of the first area and the second area based on the second image data and is not used for correcting a length of image formed by the first light beam;

a drive signal generation unit configured to generate a first drive signal for driving the first light emitting element based on the first image data corresponding to the first light emitting element and generate a second drive signal for driving the second light emitting element based on the second image data corresponding to the second light emitting element, the second drive signal including a signal corresponding to the first area and generated based on the second image data corresponding to the first area and the first correction data, and the second drive signal including a signal corresponding to the second area and generated based on the second image data corresponding to the second area and the second correction data; and a drive unit configured to cause the first light emitting element to emit the first light beam based on the first drive signal and cause the second light emitting element to emit the second light beam based on the second drive signal, wherein the drive signal generation unit generates the first drive signal and the second drive signal so as to form pixels included in each of the first image and the second image, and the first correction data and the second correction data are data for inserting a pixel or auxiliary pixel that is less in width than a pixel or removing a pixel or auxiliary pixel that is less in width than a pixel for correcting the length of image.

2. The image forming apparatus according to claim 1, wherein the output unit includes a storage unit configured to store the first correction data and the second correction data, and a control unit configured to read out the first correction data and the second correction data from the storage unit and output the read-out first correction data and the read-out second correction data to the drive signal generation unit.

3. The image forming apparatus according to claim 1, further comprising a detection unit configured to detect an environmental temperature, and wherein the output unit includes a storage unit configured to store the first correction data and the second correction data, and a control unit configured to read out the first correction data and the second correction data from the storage unit to correct the first correction data and the second correction data based on the detecting result of the detection unit, and output the corrected first correction data and the corrected second correction data to the drive signal generation unit.

4. The image forming apparatus according to claim 2, wherein the deflection unit includes a rotary polygon mirror provided with a plurality of reflecting surfaces for deflecting the first light beam and the second light beam, the image forming apparatus further comprising an identification unit configured to identify a reflecting surface which is to reflect the first light beam and the second light beam emitted from the light source, out of the plurality of reflecting surfaces of the rotary polygon mirror, and wherein the storage unit stores the first correction data and the second correction data associated with each of the reflecting surfaces of the rotary polygon mirror, and wherein the control unit outputs the first correction data and the second correction data associated with the reflecting surface which is identified by the identification unit to the drive signal generation unit.

5. The image forming apparatus according to claim 1, wherein the first correction data corrects the signal corresponding to the first area in the second drive signal so that a first length of image to be formed in the first area by scanning with the second light beam based on the second drive signal is equal to a length of image to be formed in the first area by scanning with the first light beam based on the first drive signal, and the second correction data corrects the signal corresponding to the second area in the second drive signal so that a second length of image to be formed in the second area by scanning with the second light beam based on the second drive signal is equal to a length of image to be formed in the second area by scanning with the first light beam based on the first drive signal.

6. The image forming apparatus according to claim 1, wherein the light source is a semiconductor laser including the first light emitting element configured to emit a first laser beam as the first light beam and the second light emitting element configured to emit a second laser beam as the second light beam.

7. An image forming apparatus comprising:

a photosensitive member configured to be rotatable;

a light source including a plurality of light emitting elements configured to emit a plurality of light beams for forming an electrostatic latent image corresponding to an image to be formed on a recording medium, the plurality of light emitting elements being arranged such that the light beams expose different positions on the photosensitive member in a rotation direction of the photosensitive member;

a deflection unit configured to deflect the plurality of light beams emitted from the light source such that the light beams scan the photosensitive member;

a lens configured to guide the light beams deflected by the deflection unit to the photosensitive member;

an image data generation unit configured to generate image data corresponding to the plurality of light emitting elements respectively based on an input image data;

an output unit configured to output a plurality of correction data corresponding to each of the plurality of light emitting elements respectively and corresponding to each of a plurality of areas respectively on the photosensitive member in a scanning direction of the plurality of light beams, wherein each of the plurality of correction data is used for correcting a length of image corresponding to each of the plurality of areas in the scanning direction to be formed by each of the plurality of light beams;

a drive signal generation unit configured to generate drive signals for driving the plurality of light emitting elements, respectively, based on the image data corresponding to each of the plurality of light emitting elements and each of the plurality of areas and the correction data corresponding to the plurality of light emitting elements; and a drive unit configured to cause the light source to emit the plurality of light beams, based on the drive signals generated by the drive signal generation unit, wherein the drive signal generation unit generates the drive signals so as to form pixels included in each image, and wherein the first plurality of correction data is data for inserting a pixel or auxiliary pixel that is less in width than a pixel or removing a pixel or auxiliary pixel that is less in width than a pixel for correcting the length of image.

8. The image forming apparatus according to claim 7, wherein the output unit includes a storage unit configured to store the plurality of correction data, and a control unit configured to read out the plurality of correction data from the storage unit and output the read-out the plurality of correction data to the drive signal generation unit.

9. The image forming apparatus according to claim 8, wherein the deflection unit includes a rotary polygon mirror provided with a plurality of reflecting surfaces for deflecting the plurality of light beams, the image forming apparatus further comprising an identification unit configured to identify each of reflecting surfaces which are to reflect the plurality of light beams emitted from the light source, out of the plurality of reflecting surfaces of the rotary polygon mirror, and wherein the storage unit stores the plurality of correction data associated with each of the reflecting surfaces of the rotary polygon mirror, and wherein the control unit outputs the plurality of correction data associated with the reflecting surface which is identified by the identification unit to the drive signal generation unit.

10. The image forming apparatus according to claim 7, further comprising a detection unit configured to detect an environmental temperature, and wherein the output unit includes a storage unit configured to store the plurality of correction data, and a control unit configured to read out the plurality of correction data from the storage unit to correct the plurality of correction data based on the detecting result of the detection unit, and output the corrected plurality of correction data to the drive signal generation unit.

11. The image forming apparatus according to claim 7, wherein the first plurality of correction data corrects the signals respectively corresponding to one of the second plurality of areas to be scanned by one of the plurality of light beams in the drive signal so that lengths of image to be formed in one of the second plurality of areas by scanning with the plurality of light beams based on the drive signals are equal to each other.

12. The image forming apparatus according to claim 7, wherein the light source is a semiconductor laser including the plurality of light emitting elements configured to a plurality of laser beams as the plurality of the light beams.

13. An image forming apparatus comprising:

a photosensitive member configured to be rotatable;

a light source including a first light emitting element configured to emit a first light beam and a second light emitting element configured to emit a second light beam and configured to form an electrostatic latent image corresponding to an image to be formed on a recording medium, on the photosensitive member, the first light emitting element and the second light emitting element being arranged such that the first light beam and the second light beam expose different positions on the photosensitive member in a rotation direction of the photosensitive member;

a deflection unit configured to deflect the first light beam and the second light beam emitted from the light source such that the first light beam and the second light beam scan the photosensitive member;

a lens configured to guide the first light beam and the second light beam deflected by the deflection unit to the photosensitive member;

an image data generation unit configured to generate first image data corresponding to the first light emitting element and second image data corresponding to the second light emitting element based on an input image data;

an output unit configured to output a first correction data corresponding to a first area on the photosensitive member, and a second correction data corresponding to a second area on the photosensitive member different from the first area in a scanning direction of the first light beam and the second light beam, and each of the first correction data and the second correction data is used for correcting a exposure position of the second light beam at the first area and the second area based on the second image data and is not used for correcting a length of image formed by the first light beam;

a drive signal generation unit configured to generate a first drive signal for driving the first light emitting element based on the first image data corresponding to the first light emitting element and generate a second drive signal for driving the second light emitting element based on the second image data corresponding to the second light emitting element, the second drive signal including a signal corresponding to the first area and generated based on the second image data corresponding to the first area and the first correction data, and the second drive signal including a signal corresponding to the second area and generated based on the second image data corresponding to the second area and the second correction data; and a drive unit configured to cause the first light emitting element to emit the first light beam based on the first drive signal and cause the second light emitting element to emit the second light beam based on the second drive signal, wherein the drive signal generation unit generates the first drive signal and the second drive signal so as to form pixels included in each of the first image and the second image, and the first correction data and the second correction data are data for inserting a pixel or auxiliary pixel that is less in width than a pixel or removing a pixel or auxiliary pixel that is less in width than a pixel for correcting the exposure position.

14. The image forming apparatus according to claim 13, wherein the output unit includes a storage unit configured to store the first correction data and the second correction data, and a control unit configured to read out the first correction data and the second correction data from the storage unit and output the read-out first correction data and the read-out second correction data to the drive signal generation unit.

15. The image forming apparatus according to claim 14, wherein the deflection unit includes a rotary polygon mirror provided with a plurality of reflecting surfaces for deflecting the first light beam and the second light beam, the image forming apparatus further comprising an identification unit configured to identify a reflecting surface which is to reflect the first light beam and the second light beam emitted from the light source, out of the plurality of reflecting surfaces of the rotary polygon mirror, and wherein the storage unit stores the first correction data and the second correction data associated with each of the reflecting surfaces of the rotary polygon mirror, and wherein the control unit outputs the first correction data and the second correction data associated with the reflecting surface which is identified by the identification unit to the drive signal generation unit.

16. The image forming apparatus according to claim 13, further comprising a detection unit configured to detect an environmental temperature, and wherein the output unit includes a storage unit configured to store the first correction data and the second correction data, and a control unit configured to read out the first correction data and the second correction data from the storage unit to correct the first correction data and the second correction data based on the detecting result of the detection unit, and output the corrected first correction data and the corrected second correction data to the drive signal generation unit.

17. The image forming apparatus according to claim 13, wherein the light source is a semiconductor laser including the first light emitting element configured to emit a first laser beam as the first light beam and the second light emitting element configured to emit a second laser beam as the second light beam.

18. An image forming apparatus comprising:

a photosensitive member configured to be rotatable;

a light source including a plurality of light emitting elements configured to emit a plurality of light beams for forming an electrostatic latent image corresponding to an image to be formed on a recording medium, the plurality of light emitting elements being arranged such that the light beams expose different positions on the photosensitive member in a rotation direction of the photosensitive member;

a deflection unit configured to deflect the plurality of light beams emitted from the light source such that the light beams scan the photosensitive member;

a lens configured to guide the light beams deflected by the deflection unit to the photosensitive member;

an image data generation unit configured to generate image data corresponding to the plurality of light emitting elements respectively based on an input image data;

an output unit configured to output a plurality of correction data corresponding to each of the plurality of light emitting elements respectively and corresponding to each of a plurality of areas respectively on the photosensitive member in a scanning direction of the plurality of light beams, wherein each of the plurality of correction data is used for correcting a exposure position of each of the plurality of light beams at the plurality of areas based on the image data corresponding to the plurality of light emitting elements respectively;

a drive signal generation unit configured to generate drive signals for driving the plurality of light emitting elements, respectively, based on the image data corresponding to the plurality of light emitting elements respectively and each of the plurality of areas and the correction data corresponding to the plurality of light emitting elements; and a drive unit configured to cause the light source to emit the plurality of light beams, based on the drive signals generated by the drive signal generation unit, wherein the drive signal generation unit generates the drive signals so as to form pixels included in each image, and wherein the first plurality of correction data is data for inserting a pixel or auxiliary pixel that is less in width than a pixel or removing a pixel or auxiliary pixel that is less in width than a pixel for correcting the exposure position.

19. The image forming apparatus according to claim 18, wherein the output unit includes a storage unit configured to store the plurality of correction data, and a control unit configured to read out the plurality of correction data from the storage unit and output the read-out the plurality of correction data to the drive signal generation unit.

20. The image forming apparatus according to claim 19, wherein the deflection unit includes a rotary polygon mirror provided with a plurality of reflecting surfaces for deflecting the plurality of light beams, the image forming apparatus further comprising an identification unit configured to identify each of reflecting surfaces which are to reflect the plurality of laser light beams emitted from the light source, out of the plurality of reflecting surfaces of the rotary polygon mirror, and wherein the storage unit stores the plurality of correction data associated with each of the reflecting surfaces of the rotary polygon mirror, and wherein the control unit outputs the plurality of correction data associated with the reflecting surface which is identified by the identification unit to the drive signal generation unit.

21. The image forming apparatus according to claim 19, wherein the light source is a semiconductor laser including the plurality of light emitting elements configured to a plurality of laser beams as the plurality of the light beams.

22. The image forming apparatus according to claim 18, further comprising a detection unit configured to detect an environmental temperature, and wherein the output unit includes a storage unit configured to store the plurality of correction data, and a control unit configured to read out the plurality of correction data from the storage unit to correct the plurality of correction data based on the detecting result of the detection unit, and output the corrected plurality of correction data to the drive signal generation unit.

23. An image forming apparatus comprising:

a photosensitive member configured to be rotatable;

a light source including a first light emitting element configured to emit a first light beam and a second light emitting element configured to emit a second light beam and configured to form an electrostatic latent image corresponding to an image to be formed on a recording medium, on the photosensitive member, the first light emitting element and the second light emitting element being arranged such that the first light beam and the second light beam expose different positions on the photosensitive member in a rotation direction of the photosensitive member;

a deflection unit configured to deflect the first light beam and the second light beam emitted from the light source such that the first light beam and the second light beam scan the photosensitive member;

a lens configured to guide the first light beam and the second light beam deflected by the deflection unit to the photosensitive member;

an image data generation unit configured to generate first image data corresponding to the first light emitting element and second image data corresponding to the second light emitting element based on an input image data;

an output unit configured to output a first correction data corresponding to a first area on the photosensitive member, a second correction data corresponding to a second area on the photosensitive member different from the first area in a scanning direction of the first light beam and the second light beam, a third correction data corresponding to the first area, a forth correction data corresponding to the second area, wherein each of the first correction data and the second correction data is used for correcting a length of image formed by the first light beam for each of the first area and the second area and wherein each of the third correction data and the forth correction data is used for correcting a length of image formed by the second light beam for each of the first area and the second area;

a drive signal generation unit configured to generate a first drive signal for driving the first light emitting element based on a first image data corresponding to the first light emitting element and generate a second drive signal for driving the second light emitting element based on a second image data corresponding to the second light emitting element, wherein the first drive signal including a signal corresponding to the first area and generated based on the first image data corresponding to the first area and the first correction data and a signal corresponding to the second area and generated based on the first image data corresponding to the second area and the second correction data, the second drive signal including a signal corresponding to the first area and generated based on the second image data corresponding to the first area and the third correction data and a signal corresponding to the second area and generated based on the second image data corresponding to the second area and the forth correction data; and a drive unit configured to cause the first light emitting element to emit the first light beam based on the first drive signal and cause the second light emitting element to emit the second light beam based on the second drive signal, wherein the drive signal generation unit generates the first drive signal and the second drive signal so as to form pixels included in each of the first image and the second image, and the first correction data and the second correction data are data for inserting a pixel or auxiliary pixel that is less in width than a pixel or removing a pixel or auxiliary pixel that is less in width than a pixel for correcting the length of image formed by the first light beam and the third correction data and the forth correction data are data for inserting a pixel or auxiliary pixel that is less in width than a pixel or removing a pixel or auxiliary pixel that is less in width than a pixel for correcting the length of image formed by the second light beam.

24. The image forming apparatus according to claim 23, wherein the output unit includes a storage unit configured to store the first correction data, the second correction data, the third correction data, and the forth correction data, and a control unit configured to read out the first correction data, the second correction data, the third correction data, and the forth correction data from the storage unit and output the read-out first correction data, the read-out second correction data, the read-out third correction data, and the read-out forth correction data to the drive signal generation unit.

25. The image forming apparatus according to claim 24, wherein the deflection unit includes a rotary polygon mirror provided with a plurality of reflecting surfaces for deflecting the first light beam and the second light beam, the image forming apparatus further comprising an identification unit configured to identify a reflecting surface which is to reflect the first light beam and the second light beam emitted from the light source, out of the plurality of reflecting surfaces of the rotary polygon mirror, and wherein the storage unit stores the first correction data, the second correction data, the third correction data, and the forth correction data associated with each of the reflecting surfaces of the rotary polygon mirror, and wherein the control unit outputs the first correction data, the second correction data, the third correction data, and the forth correction data associated with the reflecting surface which is identified by the identification unit to the drive signal generation unit.

26. The image forming apparatus according to claim 23, further comprising a detection unit configured to detect an environmental temperature, and wherein the output unit includes a storage unit configured to store the first correction data, the second correction data, the third correction data, and the forth correction data, and a control unit configured to read out the first correction data, the second correction data, the third correction data, and the forth correction data from the storage unit to correct the first correction data, the second correction data, the third correction data, and the forth correction data based on the detecting result of the detection unit, and output the corrected first correction data, the corrected second correction data, the corrected third correction data, and the corrected forth correction data to the drive signal generation unit.

27. The image forming apparatus according to claim 23, wherein the light source is a semiconductor laser including the first light emitting element configured to emit a first laser beam as the first light beam and the second light emitting element configured to emit a second laser beam as the second light beam.

28. An image forming apparatus comprising:

a photosensitive member configured to be rotatable;

a light source including a first light emitting element configured to emit a first light beam and a second light emitting element configured to emit a second light beam and configured to form an electrostatic latent image corresponding to an image to be formed on a recording medium, on the photosensitive member, the first light emitting element and the second light emitting element being arranged such that the first light beam and the second light beam expose different positions on the photosensitive member in a rotation direction of the photosensitive member;

a deflection unit configured to deflect the first light beam and the second light beam emitted from the light source such that the first light beam and the second light beam scan the photosensitive member;

a lens configured to guide the first light beam and the second light beam deflected by the deflection unit to the photosensitive member;

an image data generation unit configured to generate first image data corresponding to the first light emitting element and second image data corresponding to the second light emitting element based on an input image data;

an output unit configured to output a first correction data corresponding to a first area on the photosensitive member, a second correction data corresponding to a second area on the photosensitive member different from the first area in a scanning direction of the first light beam and the second light beam, a third correction data corresponding to the first area, a forth correction data corresponding to the second area, wherein each of the first correction data and the second correction data is used for correcting an exposure position of the first light beam at each of the first area and the second area and wherein each of the third correction data and the forth correction data is used for correcting an exposure position the second light beam for each of the first area and the second area;

a drive signal generation unit configured to generate a first drive signal for driving the first light emitting element based on a first image data corresponding to the first light emitting element and generate a second drive signal for driving the second light emitting element based on a second image data corresponding to the second light emitting element, wherein the first drive signal including a signal corresponding to the first area and generated based on the first image data corresponding to the first area and the first correction data and a signal corresponding to the second area and generated based on the first image data corresponding to the second area and the second correction data, the second drive signal including a signal corresponding to the first area and generated based on the second image data corresponding to the first area and the third correction data and a signal corresponding to the second area and generated based on the second image data corresponding to the second area and the forth correction data; and a drive unit configured to cause the first light emitting element to emit the first light beam based on the first drive signal and cause the second light emitting element to emit the second light beam based on the second drive signal, wherein the drive signal generation unit generates the first drive signal and the second drive signal so as to form pixels included in each of the first image and the second image, and the first correction data and the second correction data are data for inserting a pixel or auxiliary pixel that is less in width than a pixel or removing a pixel or auxiliary pixel that is less in width than a pixel for correcting the exposure position of the first light beam, and the third correction data and the forth correction data are data for inserting a pixel or auxiliary pixel that is less in width than a pixel or removing a pixel or auxiliary pixel that is less in width than a pixel for correcting the exposure position of the second light beam.

29. The image forming apparatus according to claim 28, wherein the output unit includes a storage unit configured to store the first correction data, the second correction data, the third correction data, and the forth correction data, and a control unit configured to read out the first correction data, the second correction data, the third correction data, and the forth correction data from the storage unit and output the read-out first correction data, the read-out second correction data, the read-out third correction data, and the read-out forth correction data to the drive signal generation unit.

30. The image forming apparatus according to claim 29, wherein the deflection unit includes a rotary polygon mirror provided with a plurality of reflecting surfaces for deflecting the first light beam and the second light beam, the image forming apparatus further comprising an identification unit configured to identify a reflecting surface which is to reflect the first light beam and the second light beam emitted from the light source, out of the plurality of reflecting surfaces of the rotary polygon mirror, and wherein the storage unit stores the first correction data, the second correction data, the third correction data, and the forth correction data associated with each of the reflecting surfaces of the rotary polygon mirror, and wherein the control unit outputs the first correction data, the second correction data, the third correction data, and the forth correction data associated with the reflecting surface which is identified by the identification unit to the drive signal generation unit.

31. The image forming apparatus according to claim 28, wherein the light source is a semiconductor laser including the first light emitting element configured to emit a first laser beam as the first light beam and the second light emitting element configured to emit a second laser beam as the second light beam.

32. The image forming apparatus according to claim 28, further comprising a detection unit configured to detect an environmental temperature, and wherein the output unit includes a storage unit configured to store the first correction data, the second correction data, the third correction data, and the forth correction data, and a control unit configured to read out the first correction data, the second correction data, the third correction data, and the forth correction data from the storage unit to correct the first correction data, the second correction data, the third correction data, and the forth correction data based on the detecting result of the detection unit, and output the corrected first correction data, the corrected second correction data, the corrected third correction data, and the corrected forth correction data to the drive signal generation unit.

33. An image forming apparatus comprising:

a photosensitive member configured to be rotatable;

a light source including a first light emitting element configured to emit a first light beam and a second light emitting element configured to emit a second light beam and configured to form an electrostatic latent image corresponding to an image to be formed on a recording medium, on the photosensitive member, the first light emitting element and the second light emitting element being arranged such that the first light beam and the second light beam expose different positions on the photosensitive member in a rotation direction of the photosensitive member;

a deflection unit configured to deflect the first light beam and the second light beam emitted from the light source such that the first light beam and the second light beam scan the photosensitive member;

a lens configured to guide the first light beam and the second light beam deflected by the deflection unit to the photosensitive member;

an output unit configured to output a first correction data and a second correction data corresponding to the first light emitting element, and configured to output a third correction data and a forth correction data corresponding to the second light emitting element, wherein the first correction data and the second correction data respectively correspond to a different position in the scanning direction of the first light beam, and the first correction data and the second correction data are used for correcting a exposure position of the first light beam on the photosensitive member in the scanning direction of the first light beam and the forth correction data and the third correction data respectively correspond to a different position in the scanning direction of the second light beam, and the third correction data and the forth correction data are used for correcting a exposure position of the second light beam on the photosensitive member in the scanning direction of the second light beam;

a drive signal generation unit configured to generate a first drive signal for driving the first light emitting element based on image data corresponding to the first light emitting element and the first correction data and the second correction data and configured to generate drive a second drive signal for driving the second light emitting element based on image data corresponding to the second light emitting element and the third correction data and the forth correction data; and a drive unit configured to cause the first light emitting element to emit the first light beam based on the first drive signal and cause the second light emitting element to emit the second light beam based on the second drive signal, wherein the drive signal generation unit generates the first drive signal and the second drive signal so as to form pixels included in each of the first image and the second image, and the first correction data and the second correction data are data for inserting a pixel or auxiliary pixel that is less in width than a pixel or removing a pixel or auxiliary pixel that is less in width than a pixel for correcting the length of image formed by the first light beam and the third correction data and the forth correction data are data for inserting a pixel or auxiliary pixel that is less in width than a pixel or removing a pixel or auxiliary pixel that is less in width than a pixel for correcting the length of image formed by the second light beam.

34. An image forming apparatus comprising:

a photosensitive member configured to be rotatable;

a light source including a first light emitting element configured to emit a first light beam and a second light emitting element configured to emit a second light beam and configured to form an electrostatic latent image corresponding to an image to be formed on a recording medium, on the photosensitive member, the first light emitting element and the second light emitting element being arranged such that the first light beam and the second light beam expose different positions on the photosensitive member in a rotation direction of the photosensitive member;

a deflection unit configured to deflect the first light beam and the second light beam emitted from the light source such that the first light beam and the second light beam scan the photosensitive member;

a lens configured to guide the first light beam and the second light beam deflected by the deflection unit to the photosensitive member;

an output unit configured to output a first correction data and a second correction data corresponding to the first light emitting element, and configured to output a third correction data and a forth correction data corresponding to the second light emitting element, wherein the first correction data and the second correction data respectively correspond to a different position in the scanning direction of the first light beam, and the first correction data and the second correction data are used for correcting a length of image formed by the first light beam and the forth correction data and the third correction data respectively correspond to a different position in the scanning direction of the second light beam, and the third correction data and the forth correction data are used for correcting a length of image formed by the second light beam;

a drive signal generation unit configured to generate a first drive signal for driving the first light emitting element based on image data corresponding to the first light emitting element and the first correction data and the second correction data and configured to generate drive a second drive signal for driving the second light emitting element based on image data corresponding to the second light emitting element and the third correction data and the forth correction data; and a drive unit configured to cause the first light emitting element to emit the first light beam based on the first drive signal and cause the second light emitting element to emit the second light beam based on the second drive signal, wherein the drive signal generation unit generates the first drive signal and the second drive signal so as to form pixels included in each of the first image and the second image, and the first correction data and the second correction data are data for inserting a pixel or auxiliary pixel that is less in width than a pixel or removing a pixel or auxiliary pixel that is less in width than a pixel for correcting the exposure position of the first light beam, and the third correction data and the forth correction data are data for inserting a pixel or auxiliary pixel that is less in width than a pixel or removing a pixel or auxiliary pixel that is less in width than a pixel for correcting the exposure position of the second light beam.

* * * * *